(12) United States Patent
Park et al.

(10) Patent No.: US 12,058,775 B2
(45) Date of Patent: Aug. 6, 2024

(54) ELECTRONIC DEVICE MULTIPLE SIM AND OPERATION METHOD THEREOF

(71) Applicant: Samsung Electronics Co., Ltd., Suwon-si (KR)

(72) Inventors: Sungjuhn Park, Suwon-si (KR); Sanghyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 17/577,937

(22) Filed: Jan. 18, 2022

(65) Prior Publication Data

US 2022/0240078 A1 Jul. 28, 2022

Related U.S. Application Data

(63) Continuation of application No. PCT/KR2022/000325, filed on Jan. 7, 2022.

(30) Foreign Application Priority Data

Jan. 22, 2021 (KR) ........................ 10-2021-0009615

(51) Int. Cl.
*H04W 8/18* (2009.01)
*H04W 24/08* (2009.01)
(Continued)

(52) U.S. Cl.
CPC ........... *H04W 8/183* (2013.01); *H04W 24/08* (2013.01); *H04W 24/10* (2013.01); *H04W 68/005* (2013.01); *H04W 76/28* (2018.02)

(58) Field of Classification Search
CPC ..... H04W 8/183; H04W 24/08; H04W 24/10; H04W 68/005; H04W 76/28; H04W 76/15; H04W 88/06; H04W 68/12
See application file for complete search history.

(56) References Cited

U.S. PATENT DOCUMENTS

| 2013/0150095 A1 | 6/2013 | Mehio et al. |
| 2015/0237497 A1 | 8/2015 | Chen et al. |

(Continued)

FOREIGN PATENT DOCUMENTS

| KR | 10-1455097 B1 | 11/2014 |
| KR | 10-2016-0132055 A | 11/2016 |

(Continued)

OTHER PUBLICATIONS

International Search Report dated Apr. 12, 2022, issued in International Patent Application No. PCT/KR2022/000325.

*Primary Examiner* — Eric Myers
(74) *Attorney, Agent, or Firm* — Jefferson IP Law, LLP

(57) ABSTRACT

An electronic device is provided. The electronic device includes a processor connected to a first SIM and a second SIM, and RF devices used for communication based on the first SIM and on the second SIM, the processor identifies expiration of a timer for paging monitoring associated with the second SIM while use of the RF devices is allocated to the first SIM, to allocate use of the RF devices to the second SIM to perform first paging monitoring and first-type measurement, reallocates use of the RF devices to the first SIM according to completion of the first paging monitoring and the first-type measurement, identifies expiration of the timer for the paging monitoring associated with the second SIM while use of the RF devices is reallocated to the first SIM, and allocates use of the RF devices to the second SIM to perform second paging monitoring and second-type measurement.

18 Claims, 17 Drawing Sheets

(51) Int. Cl.
  *H04W 24/10* (2009.01)
  *H04W 68/00* (2009.01)
  *H04W 76/28* (2018.01)

(56) References Cited

U.S. PATENT DOCUMENTS

| | | |
|---|---|---|
| 2017/0078904 A1 | 3/2017 | Tang et al. |
| 2020/0128622 A1 | 4/2020 | Song et al. |
| 2020/0367311 A1 | 11/2020 | Choi et al. |
| 2022/0191824 A1* | 6/2022 | Kumar ................. H04W 76/18 |
| 2024/0073765 A1* | 2/2024 | Shrivastava .......... H04W 76/27 |

FOREIGN PATENT DOCUMENTS

| | | |
|---|---|---|
| KR | 10-2020-0043615 A | 4/2020 |
| KR | 10-2020-0132617 A | 11/2020 |
| WO | 2020/209620 A1 | 10/2020 |

* cited by examiner

ELECTRONIC DEVICE MULTIPLE SIM AND OPERATION METHOD THEREOF

CROSS-REFERENCE TO RELATED APPLICATION(S)

This application is a continuation application, claiming priority under § 365(c), of an International application No. PCT/KR2022/000325, filed on Jan. 7, 2022, which is based on and claims the benefit of a Korean patent application number 10-2021-0009615, filed on Jan. 22, 2021, in the Korean Intellectual Property Office, the disclosure of which is incorporated by reference herein in its entirety.

BACKGROUND

1. Field

The disclosure relates to an electronic device supporting multiple subscriber identity modules (SIMs) and an operation method thereof.

2. Description of Related Art

In a wireless communication system, an electronic device (e.g., a user equipment (UE)) can use a voice communication or data communication service by accessing a wireless communication network at a predetermined location or while moving. In order to provide a communication service to the electronic device, an appropriate authentication process is needed. A universal integrated circuit card (UICC) is inserted into the electronic device, and a universal subscriber identity module (USIM) installed in the UICC is used when authentication between the electronic device and a server of a communication provider (a mobile network operator (MNO)) is performed. The UICC may be referred to as a subscriber identity module (SIM) card in the case of global system for mobile communications (GSM), and may be referred to as a universal subscriber identity module (USIM) card in the case of wideband code division multiple access (WCDMA) or long-term evolution (LTE). The USIM card or the SIM card may exist as an independent UICC, may be embedded in the electronic device (e.g., embedded SIM or eSIM), or may be integrated into at least one of chips included in the electronic device (e.g., integrated SIM or iSIM).

If a user of the electronic device subscribes to a wireless communication service provided by the MNO, the MNO provides a UICC (e.g., a SIM card or a USIM card) to the user, and the user may insert the UICC provided by the MNO into the electronic device. According to an embodiment, when the user of the electronic device subscribes to a wireless communication service provided by the MNO, the user may receive information to be stored in the UICC (or an eSIM card or an iSIM card) included in the electronic device, from the MNO. When the UICC is inserted into the electronic device, or information to be stored in the UICC is received from the MNO, a USIM application installed in the UICC uses an encryption key value for authentication and an international mobile subscriber identity (IMSI) value stored in the UICC, so as to perform an appropriate authentication process with the MNO server in which the same values are stored. The wireless communication service can be used after the appropriate authentication process is performed.

When information related to a SIM is provided to the UICC (e.g., eSIM or iSIM) mounted in the electronic device, from the MNO server, an encryption key value for authentication and an international mobile subscriber identity (IMSI) value, which are included in the information related to the SIM or can be generated through the information related to the SIM, may be used to perform an appropriate authentication process with the MNO server in which the same values are stored. The wireless communication service can be used after the appropriate authentication process is performed.

An electronic device may support two or more SIMs, and the electronic device may be referred to as a dual-SIM or multi-SIM electronic device. When two or more SIM cards are mounted in the electronic device, it may mean that the electronic device includes two or more independent UICCs. Alternatively, when two or more SIM cards are mounted in the electronic device, it may mean that the electronic device includes one or more independent UICCs and one or more eSIM cards. Alternatively, when two or more SIM cards are mounted in the electronic device, it may mean that the electronic device includes one or more independent UICCs and one or more iSIM cards. Alternatively, when two or more SIM cards are mounted in the electronic device, it may mean that the electronic device includes an eSIM card or an iSIM card supporting two or more networks. The dual-SIM or multi-SIM electronic device may support multiple SIMs, and each SIM may be associated with different subscriptions. A mode in which one transceiver transmits or receives a signal associated with multiple SIMs may be referred to as a dual SIM dual standby (DSDS) mode. In this case, when one SIM transmits or receives a signal, another SIM may be in a standby mode. Alternatively, a mode in which both SIMs can be simultaneously activated may be referred to as a dual SIM dual active (DSDA) mode.

The above information is presented as background information only to assist with an understanding of the disclosure. No determination has been made, and no assertion is made, as to whether any of the above might be applicable as prior art with regard to the disclosure.

In a case where multiple SIMs supported by an electronic device operate in a DSDS mode, while an operation associated with one SIM is performed, an operation associated with other SIMs cannot be performed. With respect to a specific SIM, when the specific SIM cannot use a radio frequency (RF) resource according to performing of the operation associated with other SIMs, it may be referred to as blackout of the specific SIM. For example, while at least on of paging monitoring, cell searching, or cell measurement is performed in other SIMs, an operation by the specific SIM may be suspended. Due to the blackout of the specific SIM, a service associated with the specific SIM may be suspended or delayed. Specifically, in a specific paging occasion (PO) of other SIMs, paging monitoring and multiple measurements (for example, at least two of intra-frequency measurement, inter-frequency measurement, or inter radio access technology (RAT) measurement) are performed, a blackout time of the specific SIM may increase.

Aspects of the disclosure are to address at least the above-mentioned problems and/or disadvantages and to provide at least the advantages described below.

SUMMARY

Accordingly, an aspect of the disclosure is to provide an electronic device and an operation method thereof that perform at least one type of measurement during a paging occasion (or a wake-up period) different from those of other types of measurements. Alternatively, an electronic device and an operation method thereof according to various embodiments may variably adjust a cycle of searching and/or measurement.

In accordance with an aspect of the disclosure, an electronic device includes at least one processor connected to a first SIM and a second SIM, and at least one RF device used for communication based on the first SIM and communication based on the second SIM, wherein the at least one processor is configured to identify expiration of a timer for paging monitoring associated with the second SIM while use of the at least one RF device is allocated to the first SIM, to allocate the use of the at least one RF device to the second SIM to perform first paging monitoring and first-type measurement, to reallocate the use of the at least one RF device to the first SIM according to completion of the first paging monitoring and the first-type measurement, to identify expiration of the timer for the paging monitoring associated with the second SIM while the use of the at least one RF device is reallocated to the first SIM, and to allocate the use of the at least one RF device to the second SIM to perform second paging monitoring and second-type measurement that is different from the first-type measurement.

In accordance with another aspect of the disclosure, a method for operating an electronic device including at least one RF device used for communication based on the first SIM and communication based on the second SIM includes identifying expiration of a timer for paging monitoring associated with the second SIM while use of the at least one RF device is allocated to the first SIM, allocating the use of the at least one RF device to the second SIM to perform first paging monitoring and first-type measurement, reallocating the use of the at least one RF device to the first SIM according to completion of the first paging monitoring and the first-type measurement, identifying, expiration of the timer for the paging monitoring associated with the second SIM while the use of the at least one RF device is reallocated to the first SIM, and allocating the use of the at least one RF device to the second SIM to perform second paging monitoring and second-type measurement that is different from the first-type measurement.

In accordance with another aspect of the disclosure, an electronic device includes at least one processor connected to a first SIM and a second SIM, and at least one RF device used for communication based on the first SIM and communication based on the second SIM, wherein the at least one processor is configured to identify one or more first cycles of detection and/or measurement associated with the second SIM, according to a discontinuous reception (DRX) configuration associated with the electronic device, to allocate use of the at least one RF device to the second SIM to perform at least one detection and/or measurement, the cycle of which has arrived, when a designated trigger is not identified while an operation associated with the first SIM is performed and when at least one of the one or more first cycles arrives while the use of the at least one RF device is allocated to the first SIM, and to allocate use of the at least one RF device to the second SIM to perform at least one detection and/or measurement, the cycle of which has arrived, when the designated trigger is identified while the operation associated with the first SIM is performed and when at least one of one or more second cycles configured to be longer than the one or more first cycles, respectively, arrives while the use of the at least one RF device is allocated to the first SIM.

According to various embodiments, an electronic device capable of performing at least one type of measurement during a paging occasion (or a wake-up period) different from those of other types of measurements, and an operation method thereof can be provided. Alternatively, according to various embodiments, an electronic device capable of variably adjusting a cycle of searching and/or measurement, and an operation method thereof can be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Figure 1A:
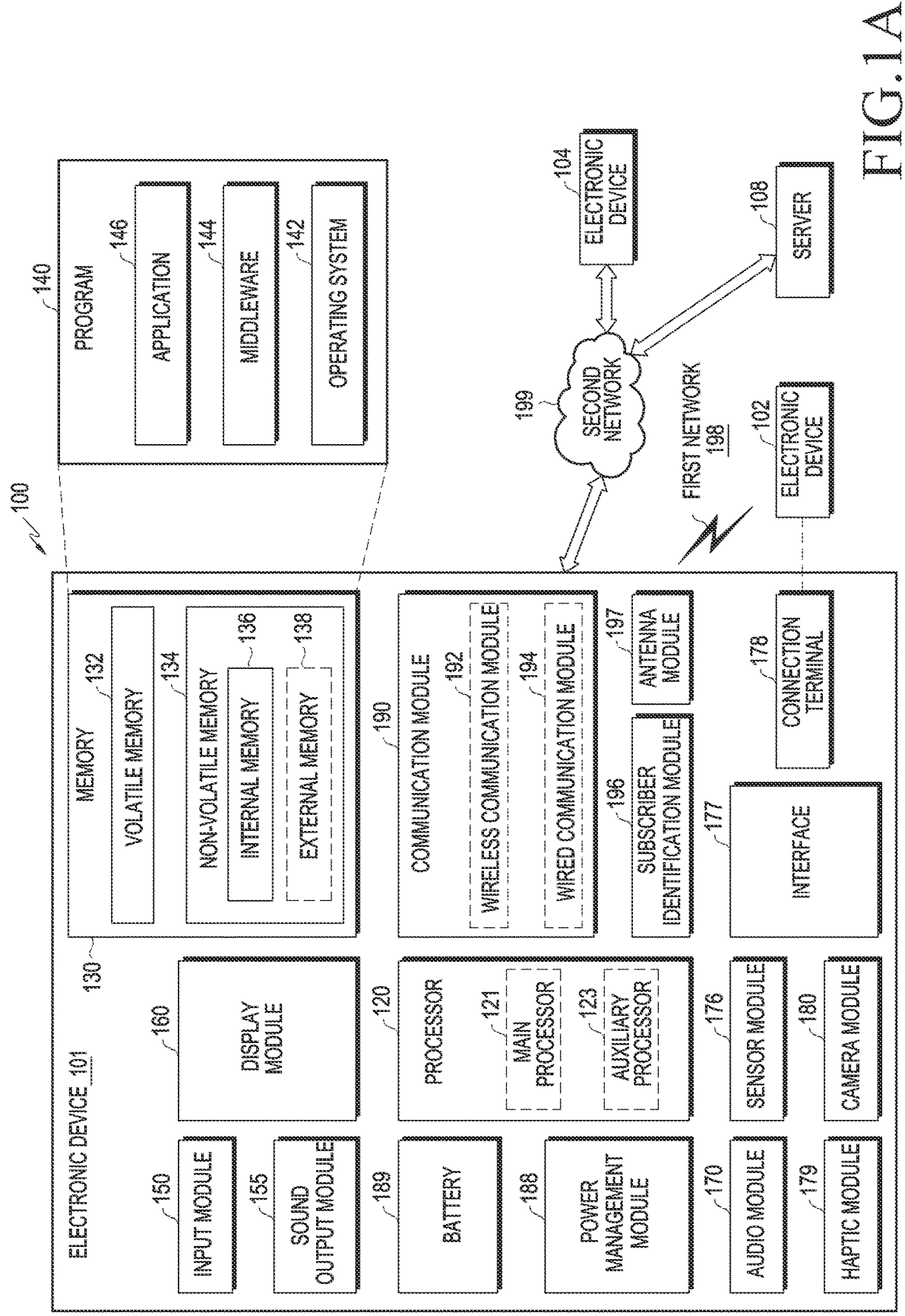
FIG. 1A is a block diagram illustrating an electronic device in a network environment according to an embodiment of the disclosure.

FIG. 1A is a block diagram illustrating an electronic device in a network environment according to an embodiment of the disclosure.

Referring to FIG. 1A, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

Figure 1B:
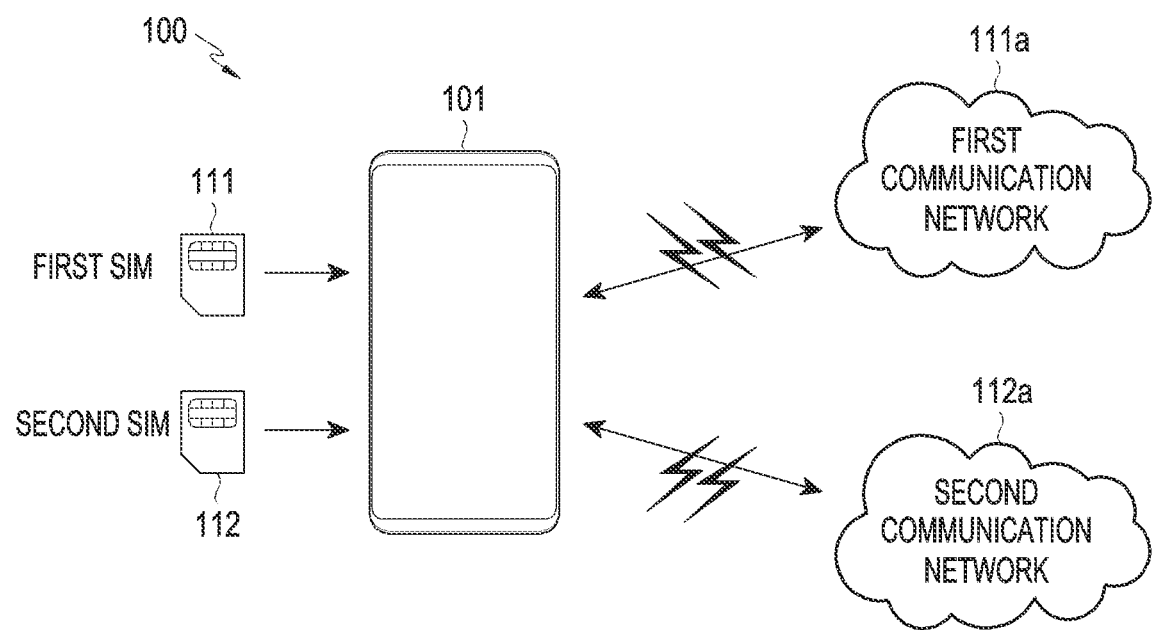
FIG. 1B illustrates a network environment including an electronic device according to an embodiment of the disclosure.

FIG. 1B illustrates a network environment including an electronic device according to an embodiment of the disclosure.

Referring to FIG. 1B, the network environment 100 according to various embodiments of the disclosure may include an electronic device 101, a first communication network 111a, a second communication network 112a, or a third communication network.

According to various embodiments, the electronic device 101 may operate in a dual SIM dual standby (DSDS) mode supporting multiple SIMs in one device. For example, two SIMs, a first SIM 111 and a second SIM 112, may be mounted to the electronic device 101. Each of the first SIM 111 and the second SIM 112 may be a removable SIM (rSIM) that is attachable or detachable. The rSIM may be a SIM which can be attached or detached to or from a slot included in the electronic device 101, and the shape/specification thereof is not limited. For example, two SIM cards may be mounted to the electronic device 101 to support two SIMs described above. According to an embodiment, for convenience of description, the first SIM 111 and the second SIM 112 are illustrated as SIM cards, but are not limited thereto. For example, one of the first SIM 111 and the second SIM may be an embedded SIM (eSIM) or an integrated SIM (iSIM). Hereinafter, for convenience of description, the SIM car is referred to as a "SIM". As shown in FIG. 1B, two SIM cards, the first SIM 111 and the second SIM 112, may be mounted to the electronic device 101. In order to receive the first SIM 111 and the second SIM 112, the electronic device 101 may include a first slot (not shown) that is a first structure and a second slot (not shown).

For example, the first SIM 111 corresponds to a SIM subscribed to a communication provider of the first communication network 111a, and the electronic device 101 may access the first communication network 111a by means of the first SIM 111 to receive a wireless communication service. The second SIM 112 corresponds to a SIM subscribed to a communication provider of the second communication network 112a, and the electronic device 101 may access the second communication network 112a by means of the second SIM 112 to receive a wireless communication service. The first communication network 111a and the second communication network 112a may be provided by the same communication provider, or may be provided by different communication providers. If the first communication network 111a and the second communication network 112a are provided by the same communication provider, it may mean that the first communication network 111a and the second communication network 111b are the same network. Alternatively, different providers may share a communication network. For example, it may be configured so that a first communication provider can use the first communication network 111a, and a second communication provider can also use the first communication network 111a. According to an embodiment, although not shown, the electronic device 101 may further include at least one additional SIM, and it will be easily understood by those skilled in the art that the number or the types of SIMs are not limited.

Figure 2A:
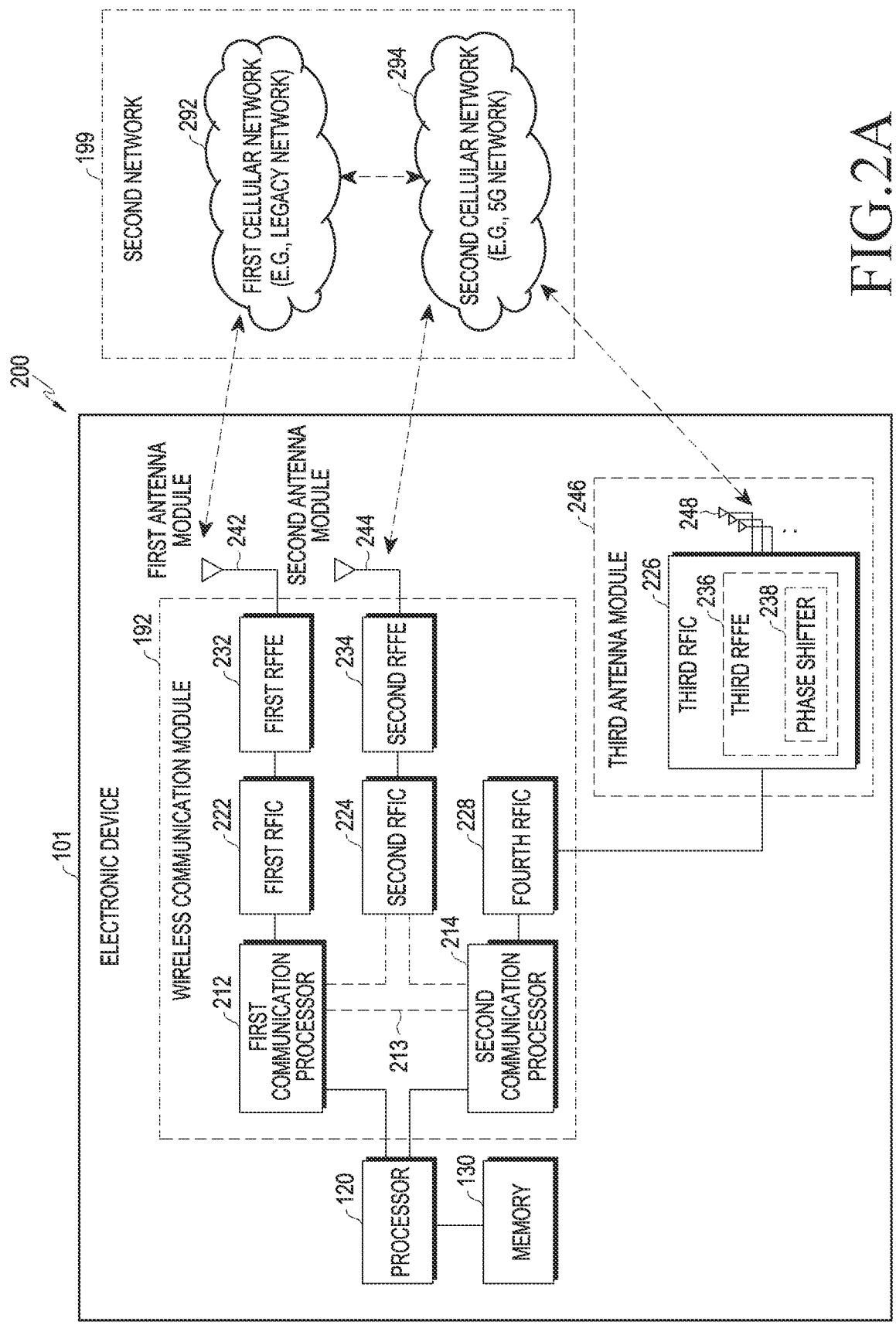
FIGS. 2A and 2B are block diagrams of an electronic device supporting legacy network communication and 5th generation (5G) network communication according to various embodiments of the disclosure.
Figure 2B:
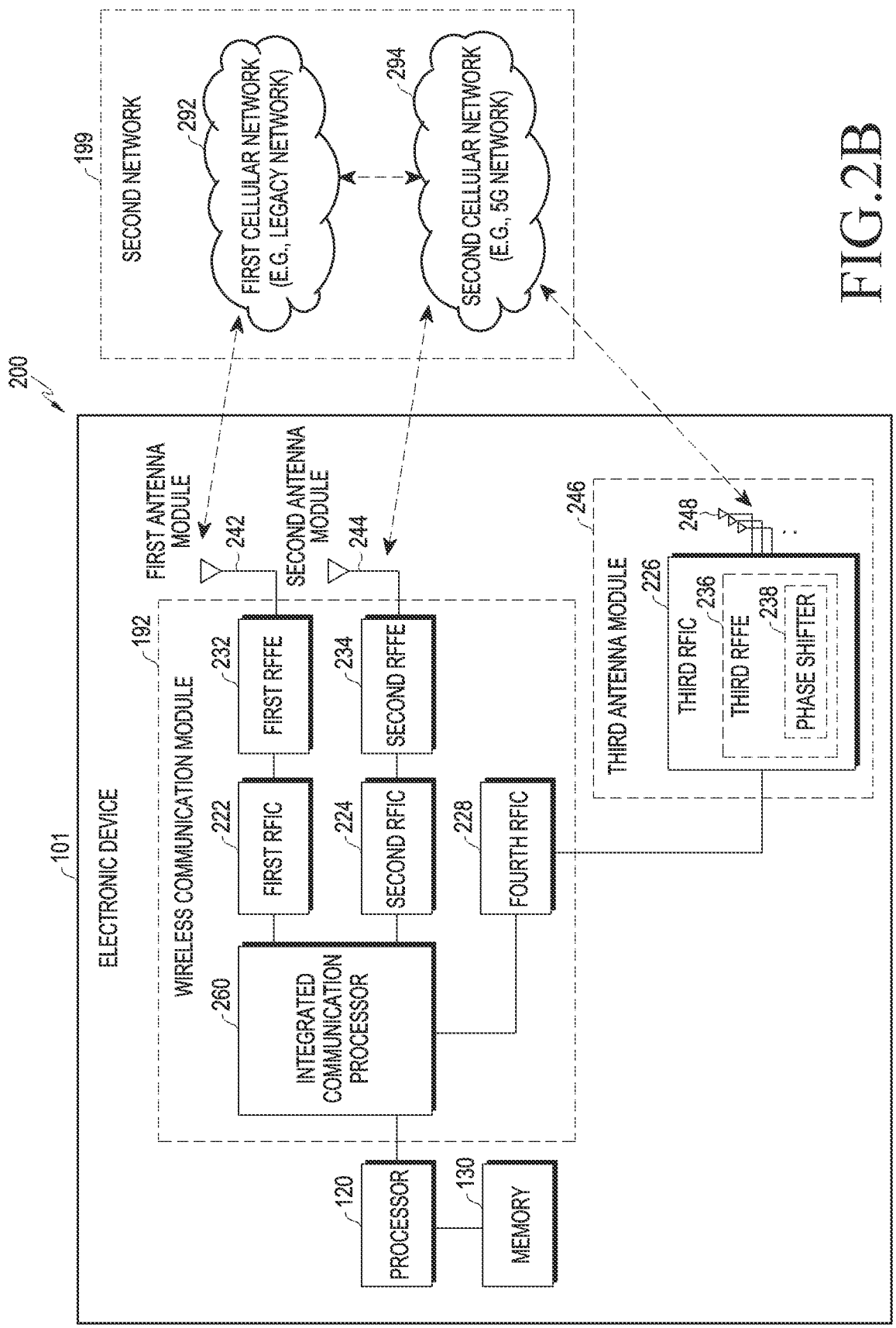

FIGS. 2A and 2B are block diagrams of an electronic device supporting legacy network communication and 5G network communication according to various embodiments of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components described in FIGS. 1A and 1B, and the second network 199 may further include at least one another network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted, or may be included as a part of the third RFIC 226.

The first communication processor 212 may establish a communication channel in a band used for wireless communication with the first cellular network 292 and may support legacy network communication through the established communication channel According to various embodiments, the first cellular network may be a legacy network including a 2nd generation (2G), a 3rd generation (3G), a 4th generation (4G), a 5G, or a long-term evolution (LTE) network. The second communication processor 214 may establish a communication channel corresponding to a designated band (e.g., about 6 GHz to about 60 GHz) among bands to be used for wireless communication with the second cellular network 294, and may support 5G network communication through the established communication channel According to various embodiments, the second cellular network 294 may be a 5G network defined in the 3G partnership project (3GPP). In addition, according to an embodiment, the first communication processor 212 or the second communication processor 214 may establish a communication channel corresponding to another designated band (e.g., about 6 GHz or less) among bands to be used for wireless communication with the second cellular network 294, and may support 5G network communication through the established communication channel.

The first communication processor 212 may transmit or receive data to or from the second communication processor 214. For example, data classified to be transmitted through the second cellular network 294 may be changed to be transmitted through the first cellular network 292. In this case, the first communication processor 212 may receive transmission data transferred from the second communication processor 214. For example, the first communication processor 212 may transmit or receive data to or from the second communication processor 214 through an interface 213 between the processors. The interface 213 between the processors may be implemented as, for example, a universal asynchronous receiver/transmitter (UART) (e.g., high speed-UART (HS-UART)) interface or a peripheral component interconnect bus express (PCIe) interface, but the type of interface is not limited. Alternatively, the first communication processor 212 and the second communication processor 214 may exchange control information and packet data information by using, for example, a shared memory. The first communication processor 212 may transmit or receive, to or from the second communication processor 214, various types of information such as sensing information, information on an output strength, and resource block (RB) allocation information.

Depending of the implementation, the first communication processor 212 may not be directly connected to the second communication processor 214. In this case, the first communication processor 212 may transmit or receive data to or from the second communication processor 214 through the processor 120 (e.g., an application processor). For example, the first communication processor 212 and the second communication processor 214 may transmit or receive data to or from the processor 120 (e.g., an application processor) through the HS-UART interface or the PCIe interface, but the type of interface is not limited. Alternatively, the first communication processor 212 and the second communication processor 214 may exchange control information and packet data information with the processor 120 (e.g., an application processor) by using a shared memory.

According to an embodiment, the first communication processor 212 and the second communication processor 214 may be implemented in a single chip or a single package. According to various embodiments, the first communication processor 212 or the second communication processor 214 may be formed in a single chip or a single package together with the processor 120, the auxiliary processor 123, or the communication module 190.

For example, referring to FIG. 2B, an integrated communication processor 260 may support all functions for communication with the first cellular network 292 and the second cellular network 294.

At the time of transmission, the first RFIC 222 may convert a baseband signal generated by the first communication processor 212 into an about 700 MHz to about 3 GHz radio frequency (RF) signal used in the first cellular network 292 (e.g., a legacy network). At the time of reception, the RF signal is acquired from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

At the time of transmission, the second RFIC 224 may convert a baseband signal generated by the first communication processor 212 or the second communication processor 214 into an RF signal (hereinafter, referred to as a "5G Sub6 RF signal") in Sub6 band (e.g., about 6 GHz or less) used for the second cellular network 294 (e.g., 5G network). At the time of reception, the 5G Sub6 RF signal may be acquired from the second cellular network 294 (e.g., 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a communication processor corresponding to the first communication processor 212 or the second communication processor 214.

The third RFIC 226 may convert a baseband signal generated by the second communication processor 214 to an RF signal (hereinafter, a 5G Above6 RF signal) in a 5G Above6 band (e.g., about 6 GHz to about 60 GHz) to be used in the second cellular network 294 (e.g., a 5G network). At the time of reception, the 5G Above6 RF signal may be acquired from the second cellular network 294 (e.g., a 5G network) through an antenna (e.g., the antenna 248), and may be preprocessed through the third RFFE 236. The third RFIC 226 may convert the preprocessed 5G Above6 RF signal into a baseband signal to be processed by the second communication processor 214. According to an embodiment, the third RFFE 236 may be formed as a part of the third RFIC 226.

According to an embodiment, the electronic device 101 may include the fourth RFIC 228, separately from the third RFIC 226 or as at least a part of the third RFIC 226. In this case, the fourth RFIC 228 may convert a baseband signal generated by the second communication processor 214 into an RF signal (hereinafter, an IF signal) in an intermediate frequency band (e.g., about 9 GHz to about 11 GHz), and then transfer the IF signal into the third RFIC 226. The third RFIC 226 may convert the IF signal into the 5G Above6 RF signal. At the time of reception, the 5G Above6 RF signal may be received from the second cellular network 294 (e.g., a 5G network) through an antenna (e.g., the antenna 248) and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a part of a single chip or a single package. According to various embodiments, as shown in FIG. 2A or 2B, when the first RFIC 222 and the second RFIC 224 are implemented as a single chip or a single package, the first RFIC 222 and the second RFIC 224 may be implemented as an integrated RFIC. In this case, the integrated RFIC may be connected to the first RFFE 232 and the second RFFE 234 to convert a baseband signal into a signal in a band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least a part of a single chip or a single package. According to an embodiment, at least one of the first antenna module 242 or the second antenna module 244 may be omitted, or may be coupled to another antenna module so as to process RF signals in multiple bands.

According to an embodiment, the third RFIC 226 and the antenna 248 may be arranged on the same substrate and may form the third antenna module 246. For example, the wireless communication module 192 or the processor 120 may be disposed on a first substrate (e.g., a main PCB). In this case, the third RFIC 226 may be disposed on a partial area (e.g., a lower surface) of a second substrate (e.g., a sub PCB) separate from the first substrate, and the antenna 248 is disposed on another partial area (e.g., an upper surface) of the second substrate, and thus the third antenna module 246 is formed. The third RFIC 226 and the antenna 248 are arranged on the same substrate, and thus the length of a transmission line therebetween can be reduced. For example, a loss (e.g., attenuation) of a signal in a high-frequency (e.g., about 6 GHz to about 60 GHz) used in 5G network communication by the transmission line can be reduced. Accordingly, the electronic device 101 can improve the quality or speed of communication with the second cellular network 294 (e.g., a 5G network).

According to an embodiment, the antenna 248 may be formed by an antenna array including multiple antenna elements which can be used for beamforming. In this case, for example, the third RFIC 226, as a part of the third RFFE 236, may include multiple phase shifters 238 corresponding to multiple antenna elements. At the time of transmission, each of the multiple phase shifters 238 may convert the phase of a 5G Above6 RF signal to be transmitted to the outside (e.g., a base station in a 5G network) of the electronic device 101 through the corresponding antenna element. At the time of reception, each of the multiple phase shifters 238 may convert the phase of a 5G Above6 RF signal received from the outside through the corresponding antenna element into the same phase or the substantially same phase. This allows transmission or reception through beamforming between the electronic device 101 and the outside.

The second cellular network 294 (e.g., a 5G network) may be operated independently from the first cellular network 292 (e.g., a legacy network) (e.g., Stand-Alone (SA)), or in connection to the first cellular network 292 (e.g., a legacy network) (e.g., Non-Stand Alone (NSA)). For example, the 5G network includes only an access network (e.g., a 5G radio access network (RAN) or a next generation RAN (NG RAN)), and does not include a core network (e.g., next generation core (NGC)). In this case, the electronic device 101 may access the access network of the 5G network, and then access an external network (e.g., Internet) under a control of a core network (e.g., an evolved packed core (EPC)) of the legacy network. Protocol information (e.g., LTE protocol information) for communication with the legacy communication or protocol information (e.g., new radio (NR) protocol information) for communication with the 5G network may be stored in the memory 230, and may be accessed by another component (e.g., the processor 120, the first communication processor 212, or the second communication processor 214).

Figure 3:
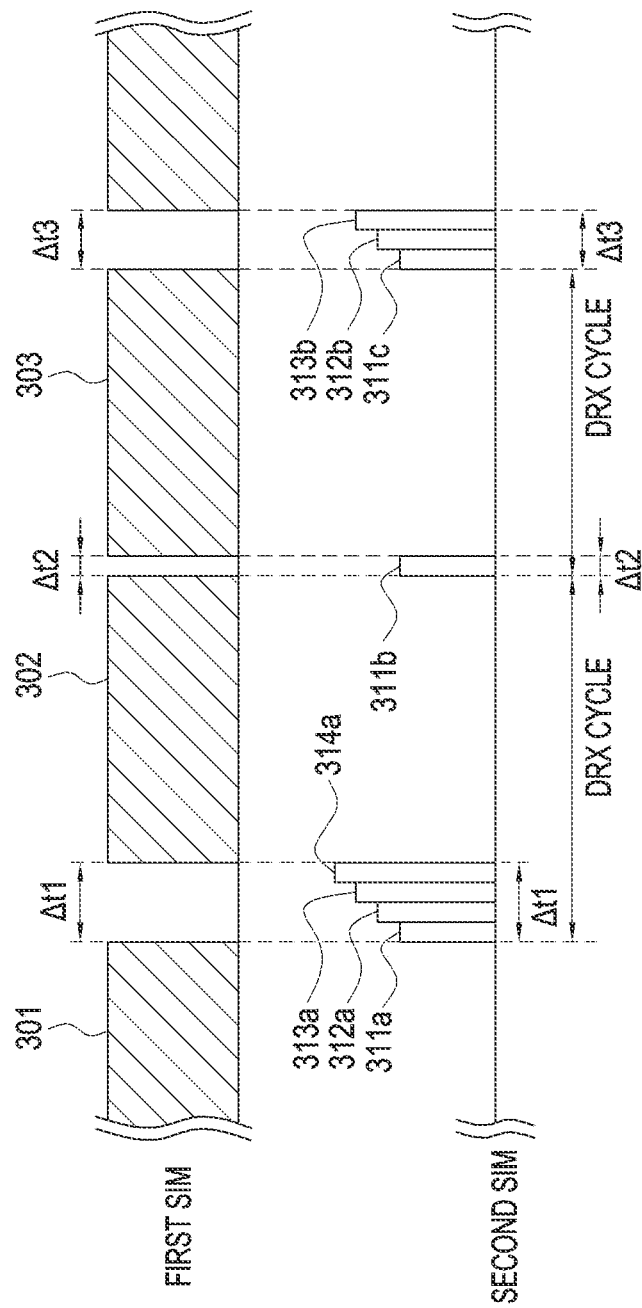
FIG. 3 illustrates RF device sharing between multiple SIMs according to a comparative example for comparison according to an embodiment of the disclosure.

FIG. 3 illustrates RF device sharing between multiple SIMs according to a comparative example for comparison according to an embodiment of the disclosure. At least a part of an operation of an electronic device according to the comparative example of FIG. 3 may be performed by an electronic device according to various embodiments.

An electronic device 101 may operate in a DSDS mode for a first SIM 111 and a second SIM 112. For example, the electronic device 101 may allocate use of an RF device to the first SIM 111, and during the allocation, an operation associated with the second SIM 112 may not be performed. For example, the electronic device 101 may allocate the use of the RF device to the second SIM 112, and during the allocation, an operation associated with the first SIM 111 may not be performed. The RF device may generate an RF signal according to, for example, a baseband signal, may mean a set of one or more devices which can transmit the generated RF signal in the form of an electromagnetic wave, and may include at least one of a first RFIC 222, a second RFIC 224, a third RFIC 226, a fourth RFIC 228, a first RFFE 232, a second RFFE 234, a third RFFE 236, a phase shifter 238, a first antenna module 242, a second antenna module 244, or a third antenna module 246. For example, when the use of the RF device is allocated to a specific SIM, it may mean that the set of one or more devices is used to process a signal associated with the specific SIM, and it may mean that during the corresponding period, processing of a signal associated with a SIM other than the specific SIM is not performed or is suspended.

Referring to FIG. 3, during a first allocation period 301, the use of the RF device may be allocated to the first SIM 111. For example, in association with the first SIM 111, the electronic device 101 may be in a connected state, a state of association with the first SIM 111 is not limited. For example, in a connected state, the electronic device 101 may receive downlink data from a network or transmit uplink data to the network.

For example, the electronic device 101 may be in a discontinuous reception (DRX) mode in association with the second SIM 112. The electronic device 101 may identify a DRX parameter from an RRC reconfiguration message (for example, an RRCConnectionReconfiguration message or an RRCReconfiguration message) received from a network associated with the second SIM 112. The DRX parameter may include at least one of, for example, a DRX cycle, an on-duration timer (onDurationTimer), or a DRX inactivity timer (drx-inactivity timer), and the type of the DRX parameter is not limited. A UE-specific DRX parameter may be identified from the RRC reconfiguration message, but if the UE-specific DRX parameter is not configured by a network, the electronic device 101 may use a default value identified from system information. In various embodiments, those skilled in the art will understand that the configuration in which the electronic device 101 uses the DRX parameter identified from the RRC reconfiguration message can be replaced with the configuration in which the electronic device 101 uses the default value identified from the system information. For example, the electronic device 101 may monitor a physical downlink control channel (PDCCH) until a DRX timer expires. When it is determined that there is monitoring result transmission data or reception data of the PDCCH, the DRX timer may restart. When the DRX timer expires, the electronic device 101 may enter a DRX mode. When the electronic device 101 enters the DRX mode, it may mean that in the electronic device 101, a node for which the DRX timer has expired stops continuous PDCCH monitoring and performs PDCCH monitoring according to a designated cycle (e.g., a DRX cycle). The DRX mode may correspond to a state of monitoring a PDCCH in some subframes only, instead of all subframes, and may be distinguished from an active state of monitoring a PDCCH in all subframes. For the second SIM 112, it is presumed that the electronic device 101 has already entered the DRX mode.

The electronic device 101 may identify that the DRX cycle has expired during the first allocation period 301. As the expiration of the DRX cycle, the electronic device 101 may perform paging monitoring 311a associated with the second SIM 112. The paging monitoring in the comparative example and various embodiments may mean an attempt to perform decoding of downlink control information (DCI) in a PDCCH by using a paging-radio network temporary identifier (P-RNTI), and may be referred to as PDCCH monitoring. The electronic device 101 may perform paging monitoring 311a associated with the second SIM 112, and may perform first-type measurement 312a (for example, intra-frequency measurement), second-type measurement 313a (for example, inter-frequency measurement), and third-type measurement 314a (for example, inter-RAT measurement). The electronic device 101 may perform the measurements 312a, 313a, and 314a upon the expiration of a first cycle of the first-type measurement 312a, the expiration of a second cycle of the second-type measurement 313a, and the expiration of a third cycle of the third-type measurement 314a. For example, when the expiration of all of the first cycle, the second cycle, and the third cycle is simultaneously performed, the electronic device 101 may perform the measurements 312a, 313a, and 314a together with the paging monitoring 311a, in association with the second SIM 112.

For example, the electronic device 101 may store (or support) information on association between the DRX cycle and detection, measurement, or evaluation in the intra-frequency, as shown in Table 1 below.

TABLE 1

| DRX cycle length [s] | $T_{detect,EUTRAN\_Intra}$ [s] (number of DRX cycles) | $T_{measure,EUTRAN\_Intra}$ [s] (number of DRX cycles) | $T_{evaluate,E-UTRAN\_Intra}$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

For example, in correspondence with an identified DRX cycle length, a detection cycle ($T_{detect,EUTRAN\_Intra}$) in the intra-frequency in an evolved universal mobile telecommunications system (UMTS) terrestrial radio access network (EUTRAN), a measurement cycle ($T_{measure,EUTRAN\_Intra}$) in the intra-frequency in the EUTRAN, and an evaluation cycle ($T_{evaluate,EUTRAN\_Intra}$) in the intra-frequency in the EUTRAN may be mapped. For example, when the DRX cycle is 0.64 s, the detection cycle in the intra-frequency in the EUTRAN may be 17.92 s (28 DRX cycles), the measurement cycle in the intra-frequency in the EUTRAN may be 1.28 s (2 DRX cycles), and the evaluation cycle in the intra-frequency in the EUTRAN may be 5.12 s (8 DRX cycles). Table 1 may follow, for example, a technical specification (TS) of the 3GPP, but is not limited thereto. In addition, information relating to the radio access technology (RAT) of the E-UTRA is applied to Table 1, but the electronic device 101 may store association information as in Table 1 for the NR RAT as well, and those skilled in the art will understand that various embodiments of the application are applicable to both the E-UTRA and the NR.

For example, the electronic device 101 may store (or support) information on association between the DRX cycle and detection, measurement, or evaluation in the inter-frequency, as shown in Table 2 below.

TABLE 2

| DRX cycle length [s] | $T_{detect,EUTRAN\_Inter}$ [s] (number of DRX cycles) | $T_{measure,EUTRAN\_Inter}$ [s] (number of DRX cycles) | $T_{evaluate,E-UTRAN\_Inter}$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

For example, in correspondence with an identified DRX cycle length, a detection cycle ($T_{detect,EUTRAN\_Inter}$) in the inter-frequency in the EUTRAN, a measurement cycle ($T_{measure,EUTRAN\_Inter}$) in the inter-frequency in the EUTRAN, and an evaluation cycle ($T_{evaluate,EUTRAN\_Inter}$) in the inter-frequency in the EUTRAN may be mapped. For example, when the DRX cycle is 0.64 s, the detection cycle in the inter-frequency in the EUTRAN may be 17.92 s (28 DRX cycles), the measurement cycle in the inter-frequency in the EUTRAN may be 1.28 s (2 DRX cycles), and the evaluation cycle in the inter-frequency in the EUTRAN may be 5.12 s (8 DRX cycles). Table 2 may follow, for example, the TS of the 3GPP, but is not limited thereto. In addition, information relating to the RAT of the E-UTRA is applied to Table 2, but the electronic device 101 may store association information as in Table 2 for the NR RAT as well, and those skilled in the art will understand that various embodiments of the application are applicable to both the E-UTRA and the NR.

For example, the electronic device 101 may store (or support) information on association between the DRX cycle and detection, measurement, or evaluation in the inter-RAT, as shown in Table 3 below.

TABLE 3

| DRX cycle length [s] | $T_{detectUTRA\_FDD}$ [s] | $T_{measureUTRA\_FDD}$ [s] (number of DRX cycles) | $T_{evaluateUTRA\_FDD}$ [s] (number of DRX cycles) |
|---|---|---|---|
| 0.32 | 30 | 5.12 (16) | 15.36 (48) |
| 0.64 |  | 5.12 (8) | 15.36 (24) |
| 1.28 |  | 6.4 (5) | 19.2 (15) |
| 2.56 | 60 | 7.68 (3) | 23.04 (9) |

For example, in correspondence with an identified DRX cycle length, a detection cycle ($T_{detectUTRA\_FDD}$) in the inter-RAT, a measurement cycle ($T_{measure,UTRA\_FDD}$) of the inter-RAT, and an evaluation cycle ($T_{evaluate,UTRA\_FDD}$) in the inter-RAT may be mapped. For example, when the DRX cycle is 0.64 s, the detection cycle in the inter-RAT in the EUTRAN may be 30 s, the measurement cycle in the inter-RAT may be 5.12 s (8 DRX cycles), and the evaluation cycle in the inter-RAT may be 15.36 s (24 DRX cycles). Table 3 may follow, for example, the TS of the 3GPP, but is not limited thereto. In addition, information relating to the RAT of the UTRA is applied to Table 3, but the electronic device 101 may store association information as in Table 3 for the NR RAT as well, and those skilled in the art will understand that association information as in Table 3 may be also stored for another NR-based RAT and various embodiments of the application are applicable to both the E-UTRA and the NR.

As shown in the examples of Table 1, Table 2, and Table 3 above, the cycle of the intra-frequency measurement, the cycle of the inter-frequency measurement, and the cycle of the inter-RAT measurement may be configured with multiples of a DRX cycle, and accordingly, the cycles of the first-type measurement 312a, the second-type measurement 313a, and the third-type measurement 314a may simultaneously expire. As the electronic device 101 performs measurements 312a, 313a, and 314a together with the paging monitoring 311a in association with the second SIM 112, it may take a first period (Δt1). Accordingly, as the use of the RF device is allocated to the second SIM 112 during the first period (Δt1), the first SIM 111 may not able to use the RF device during the first period (Δt1). Accordingly, a blackout of the first SIM 111 may correspond to the first period (Δt1). If a time taken for the paging monitoring 311a is 15 ms, a time taken for the first-type measurement 312a is 40 ms, a time taken for the second-type measurement 313a is 25 ms, and a time taken for the third-type measurement 314a is 30 ms, the first period (Δt1) corresponding to the blackout of the first SIM 111 may be 110 ms. The blackout of the first SIM 111 may influence a service based on the first SIM 111. For example, when data having relatively high data-throughput is received in association with the first SIM 111, a data reception speed may be radically reduced. Alternatively, when an ultra-low latency service is performed in association with the first SIM 111, transmission or reception of data requiring ultra-low latency processing may delay.

When the first period (Δt1) elapses, the electronic device 101 may reallocate the use of the RF device to the first SIM 111. During a second allocation period 302, the electronic device 101 may perform an operation associated with the first SIM 111 by using the RF device. The electronic device 101 may identity that a DRX cycle expires during the second allocation period 302. As the DRX cycle expires, the electronic device 101 may perform paging monitoring 311b associated with the second SIM 112. For example, the electronic device 110 may perform only paging monitoring 311b when it is identified from the first-type measurement 312a, the second-type measurement 313a, and the third-type measurement 314a that the first cycle, the second cycle, and the third cycle have not be expired. For example, it may take a second period (Δt2) for the paging monitoring 311b. Accordingly, as the use of the RF device is allocated to the second SIM 112 during the second period (Δt2), the first SIM 111 may not able to use the RF device for the second period (Δt2). Since a blackout period of the first SIM 111 is relatively shorter than that of the first period (Δt1), there is low possibility that the service based on the first SIM 111 is influenced.

As the second period (Δt2) elapses, the electronic device 101 may reallocate the use of the RF device to the first SIM 111. During a third allocation period 303, the electronic device 101 may perform an operation associated with the first SIM 111 by using the RF device. The electronic device 101 may identify that a DRX cycle expires during the third allocation period 303. Upon the expiration of the DRX cycle, the electronic device 101 may perform paging monitoring 311c associated with the second SIM 112 and perform first-type measurement 312b and second-type measurement 313b. For example, the electronic device 101 may perform the paging monitoring 311b, the first-type measurement 312b, and the second-type measurement 313b when it is identified from the first-type measurement 312a that the first period has expired, it is identified from the second-type measurement 313a that the second period has expired, and it is identified from the third-type measurement 314a that the third period has not expired. For example, it may take a third period (Δt3) for the paging monitoring 311b, the first-type measurement 312b, and the second-type measurement 313b. Accordingly, as the use of the RF device is allocated to the second SIM 112 during the third period (Δt3), the first SIM 111 may not be able to use the RF device during the third period (Δt3).

As shown in the comparative example in FIG. 3, there is high possibility that a service of the first SIM 111 is influenced according to the blackout of the first SIM 111 during a relatively long time such as the first period (Δt1) or the third period (Δt3).

Figure 4:
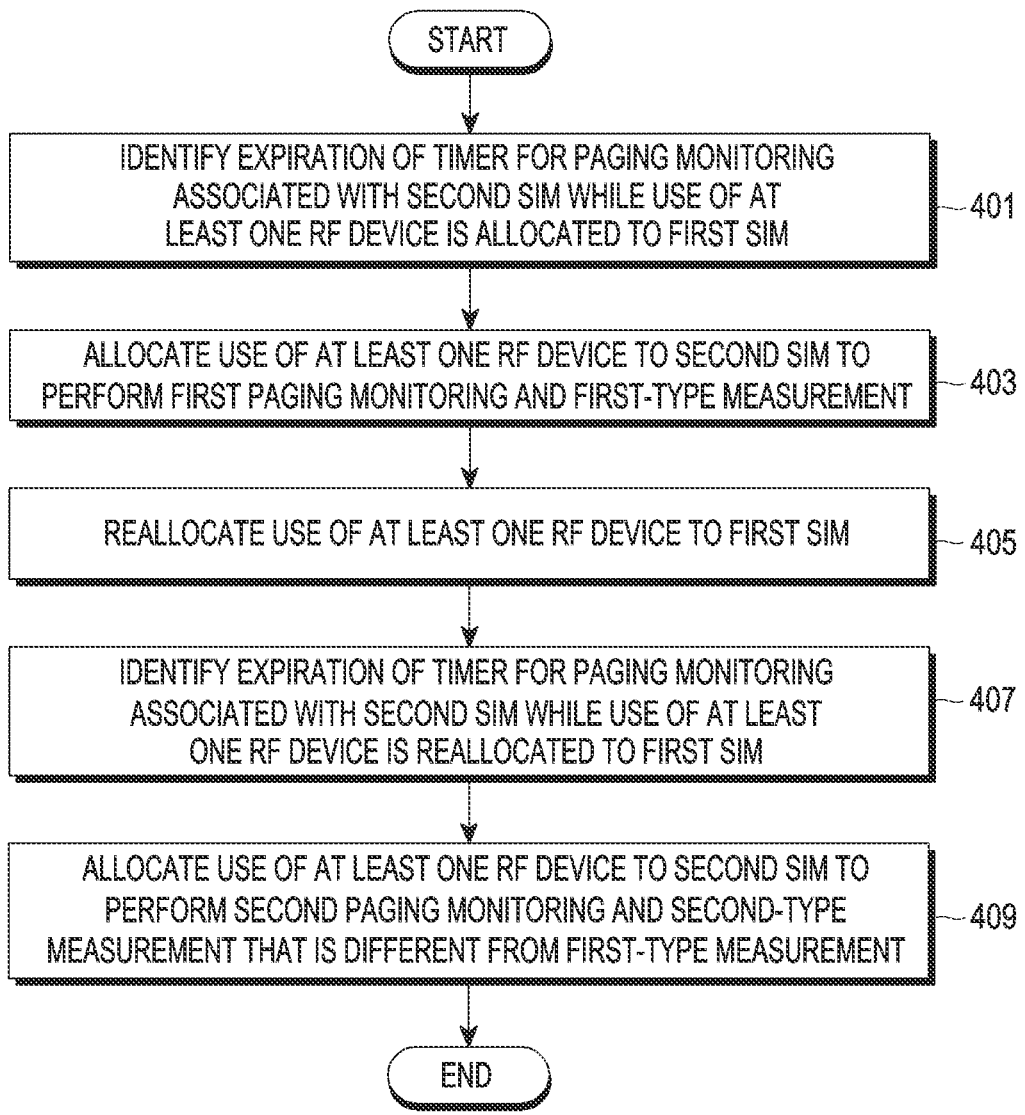
FIG. 4 is a flowchart illustrating an operation method of an electronic device according to an embodiment of the disclosure.

FIG. 4 is a flowchart illustrating an operation method of an electronic device according to an embodiment of the disclosure. An embodiment of FIG. 4 is described with reference to FIG. 5.

Figure 5:
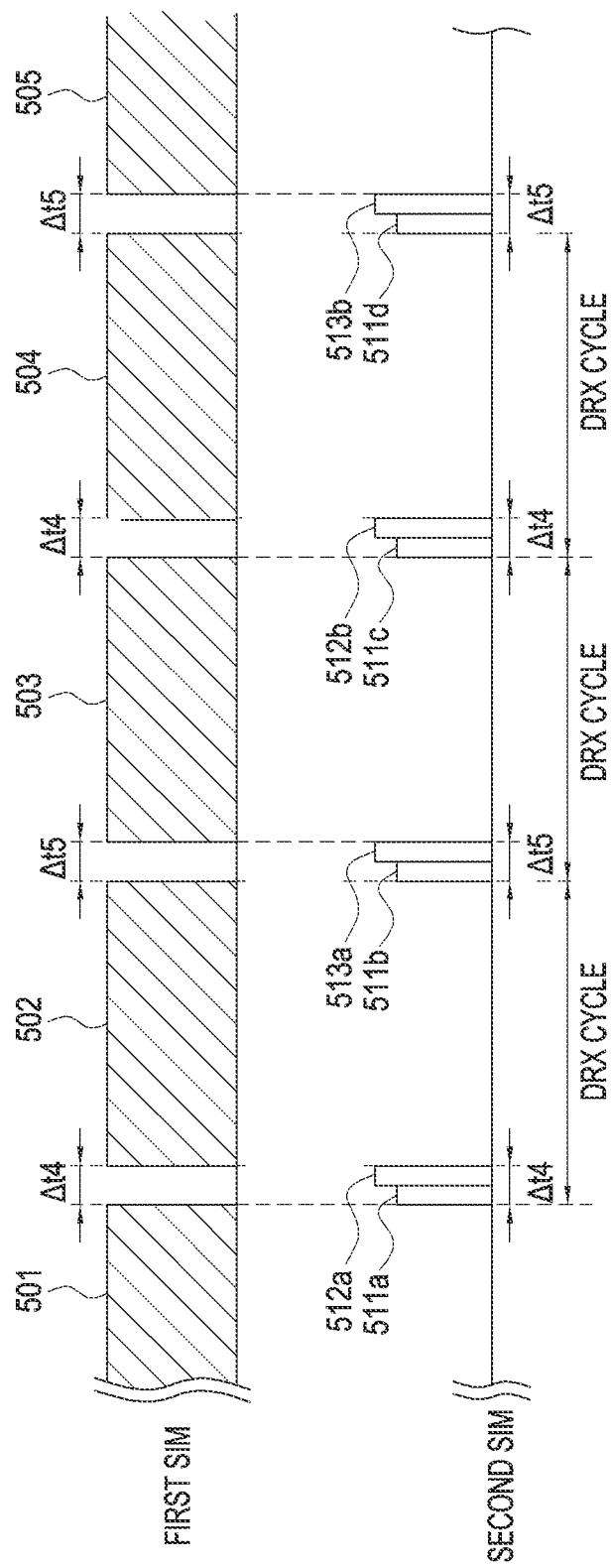
FIG. 5 illustrates RF device sharing according to multiple SIMs according to an embodiment of the disclosure.

FIG. 5 illustrates RF device sharing according to multiple SIMs according to an embodiment of the disclosure.

Referring to FIG. 4, in operation 401, the electronic device 101 (e.g., at least one of the processor 120, the first communication processor 212, the second communication processor 214, or the integrated communication processor 260) may identify the expiration (for example, the expiration of a DRX cycle) of a timer for paging monitoring associated with the second SIM 112 while the use of the at least one RF device is allocated to the first SIM 111. According to the expiration (for example, the expiration of the DRX cycle) of the timer for paging monitoring, the electronic device 101 may allocate the use of the at least one RF device to the second SIM 112 to perform first paging monitoring and first-type measurement in operation 403. For example, referring to FIG. 5, during a first allocation period 501, the use of the at least one RF device may be allocated to the first SIM 111. For example, in association with the first SIM 111, the electronic device 101 may be in a connected state, but a state of association with the first SIM 111 is not limited. For example, in the connected state, the electronic device 101 may perform reception of downlink data from a network and/or transmission of uplink data to the network. The electronic device 101 may identify the expiration of a DRX cycle during the first allocation period 501. The electronic device 101 may perform paging monitoring 511a associated with the second SIM 112 as the DRX cycle expires. The electronic device 101 may perform the paging monitoring 511a associated with the second SIM 112 and perform first-type measurement 512a (for example, intra-frequency measurement). For example, it is presumed that a first cycle of the first-type measurement 512a has expired and a second cycle of the second-type measurement and a third cycle of the third-type measurement have not expired. It may take, for example, a fourth period (Δt4) to perform the paging monitoring 511a and the first-type measurement 512a, and the fourth period (Δt4) may be shorter than the first period (Δt1) or the third period (Δt3) in the comparative example in FIG. 3. In an example, when the strength (e.g., S_relev) of a signal from a serving cell has a value smaller than a reference value (e.g., S_IntraSearch or S_NonIntraSearch), the electronic device 101 may perform searching (or detection) and/or measurement, but a trigger for the performance thereof is not limited.

FIGS. 4 and 5 illustrate that the electronic device 101 allocates the use of at least one RF device to the first SIM 111 and the second SIM 112 corresponding to an rSIM, but those skilled in the art will understand that at least a part of the first SIM 111 or the second SIM 112 may be replaced with an eSIM. For example, while the electronic device 101 allocates the use of at least one RF device to the first SIM 111 corresponding to the rSIM, the electronic device 101 may perform at least one of paging monitoring, detection, measurement, or evaluation according to the expiration of a DRX cycle associated with the eSIM. Alternatively, those skilled in the art will understand that the electronic device 101 may be implemented to allocate the use of at least one RF device to each of two operation profiles in the eSIM.

According to various embodiments, in operation 405, the electronic device 101 may reallocate the use of at least one RF device to the first SIM 111 according to the completion of performing of the paging monitoring 511a and the first-type measurement 512a. For example, referring to FIG. 5, the electronic device 101 may reallocate the use of at least one RF device to the first SIM 111 during a second allocation period 502. In operation 407, the electronic device 101 may identify the expiration (for example, the expiration of the DRX cycle) of a timer for paging monitoring associated with the second SIM 112 while the use of the at least one RF device is reallocated to the first SIM 111 (for example, the second allocation period 502). In operation 409, the electronic device 101 may allocate the use of the at least one RF device to the second SIM 112 to perform second paging monitoring 511b and second-type measurement 513a (for example, inter-frequency measurement) that is different from the first-type measurement 512a. For example, it is presumed that a second cycle of the second-type measurement 513a has expired, and a first cycle of the first-type measurement and a third cycle of the third-type measurement have not expired. It may take, for example, a fifth period (Δt5) to perform the paging monitoring 511b and the second-type measurement 513a, and the fifth period (Δt5) may be shorter than the first period (Δt1) or the third period (Δt3) in the comparative example in FIG. 3.

According to various embodiments, the electronic device 101 may configure different initiation time points for the first-type measurement 512a and the second-type measurement 513a to perform the paging monitoring 511a and the first-type measurement 512a in the first paging occasion, and to perform the paging monitoring 511b and the second-type measurement 513a in the next paging occasion. In this case, when the electronic device 101 performs paging monitoring and at least one measurement in a specific paging occasion, it may mean that the electronic device 101 in a sleep state wakes up in the specific paging occasion, performs the paging monitoring in a subframe (or a slot) corresponding to the paging occasion during the wake-up, and performs the at least one measurement while maintaining the wake-up without entering into the sleep state again. The at least one measurement may be performed during a period different from the subframe corresponding to the paging occasion, but according to implementation, at least a part of the at least one measurement may be included in the subframe corresponding to the paging occasion.

For example, when the DRX cycle is 640 ms, the first-type measurement 512*a* has a 1.28 s measurement cycle as intra-frequency measurement, and the second-type measurement 513*a* has a 1.28 s measurement cycle as inter-frequency measurement, the electronic device 101 may alternately perform the first-type measurement and the second-type measurement for each the paging occasion (or wake-up period). For example, the electronic device 101 may perform first-type measurement 512*b* and paging monitoring 511*c* associated with the second SIM 112 after a third allocation period 503 of the first SIM 111. It may take a fourth period (Δt4) to perform the paging monitoring 511*c* and the first-type measurement 512*b*. For example, the electronic device 101 may perform second-type measurement 513*b* and paging monitoring 511*d* associated with the second SIM 112 after a fourth allocation period 504 of the first SIM 111. It may take a fifth period (Δt5) to perform the paging monitoring 511*d* and the second-type measurement 513*b* followed by a fifth allocation period 505.

Although not shown, the electronic device 101 may perform third-type measurement when the third cycle of the third-type measurement (for example, inter-RAT measurement) expires. The third-type measurement may have a 5.12 measurement cycle as inter-RAT measurement, for example, and may be performed for every eight paging occasions. When the third-type measurement is performed, the paging monitoring and the third-type measurement are performed, and additionally, one of the first-type measurement and the second-type measurement may be further performed. In various embodiments, a temporal order between measurements and paging monitoring within one paging occasion is not limited.

The embodiment of FIG. 5 illustrates measurement associated with the second SIM 112 of the electronic device 101, but is illustrative, and the electronic device 101 may also perform a detection operation associated with the second SIM 112. When the identified detection cycle expires according to the DRX cycle, the electronic device 101 may also perform detection in the corresponding wake-up timing, together with the paging monitoring and measurement.

As described above, as the electronic device 101 performs the first-type measurements 512*a* and 512*b* and the second-type measurement 513*a* and 513*b* in different wake-up timings, respectively, a blackout period of the first SIM 111 may be relatively shortened.

Figure 6:
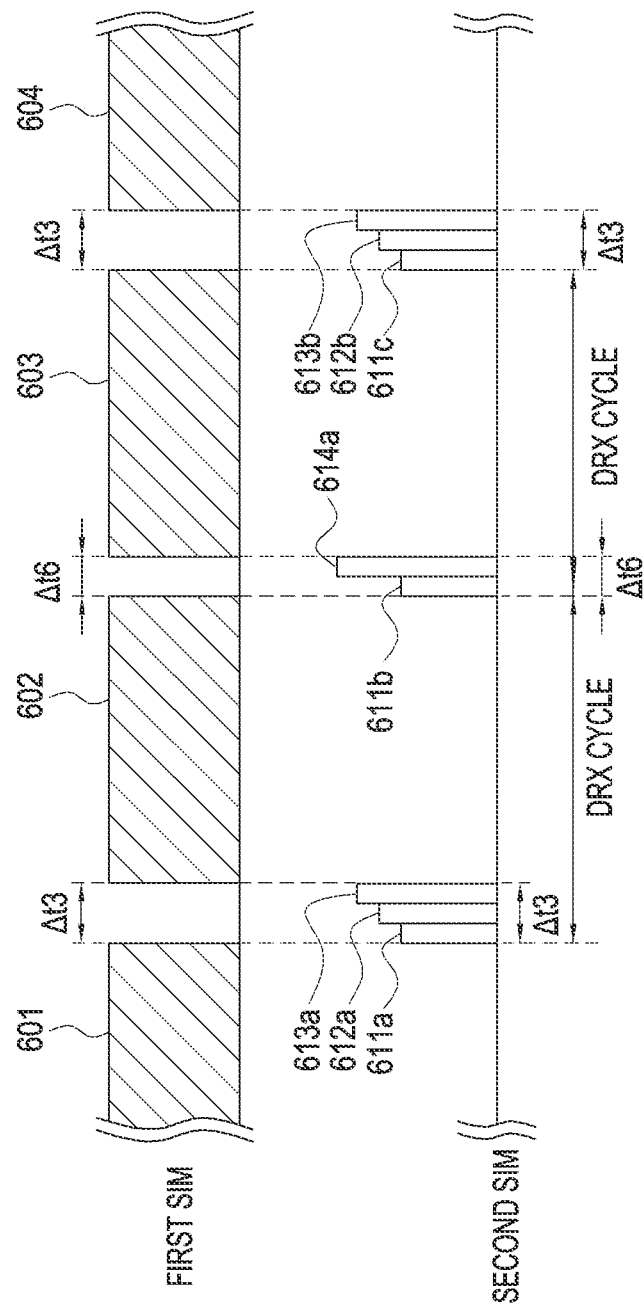
FIG. 6 illustrates RF device sharing according to multiple SIMs according to an embodiment of the disclosure.

FIG. 6 illustrates RF device sharing according to multiple SIMs according to an embodiment of the disclosure.

According to various embodiments, the electronic device 101 (for example, at least one of the processor 120, the first communication processor 212, the second communication processor 214, or the integrated communication processor 260) may identify the expiration (for example, the expiration of a DRX cycle) of a timer for paging monitoring associated with the second SIM 112 during a first allocation period 601 in which the use of the at least one RF device is allocated to the first SIM 111. According to the expiration (for example, the expiration of the DRX cycle) of the timer for paging monitoring, the electronic device 101 may allocate the use of the at least one RF device to the second SIM 112 to perform first paging monitoring 611*a*, first-type measurement 612*a* (for example, intra-frequency measurement), and second-type measurement 613*a* (for example, inter-frequency measurement).

For example, it is presumed that a first cycle of the first-type measurement 612*a* has expired, a second cycle of the second-type measurement 613*a* has expired, and a third cycle of the third-type measurement has not expired. As described above, the electronic device 101 may configure an initiation time point of the third-type measurement differently from those of the first-type measurement 612*a* and the second-type measurement 612*b* (for example, may configure the initiation time point of the third-type measurement as one subsequent paging occasion). It may take, for example, a third period (Δt3) to perform the paging monitoring 611*a*, the first-type measurement 612*a*, and the second-type measurement 613*a*, and the third period (Δt3) may be shorter than the first period (Δt1) in the comparative example in FIG. 3.

Referring to FIG. 6, the electronic device 101 may reallocate the use of at least one RF device to the first SIM 111 upon the completion of the paging monitoring 611*a*, the first-type measurement 612*a*, and the second-type measurement 613*a*. The electronic device 101 may reallocate the use of the at least one RF device to the first SIM 111 during a second allocation period 602. The electronic device 101 may identify the expiration (for example, the expiration of the DRX cycle) of the timer for paging monitoring associated with the second SIM 112 while the use of the at least one RF device is reallocated to the first SIM 111 (for example, during the second allocation period 602). The electronic device 101 may allocate the use of the at least one RF device to the second SIM 112 to perform second paging monitoring 611*b* and third-type measurement 614*a* (for example, inter-RAT measurement). For example, it is presumed that a third cycle of the third-type measurement 614*a* has expired, and a first cycle of the first-type measurement and a second cycle of the second-type measurement have not expired. It may take, for example, a sixth period (Δt6) to perform the paging monitoring 611*b* and the third-type measurement 614*a*, and the sixth period (Δt6) may be shorter than the first period (Δt1) in the comparative example in FIG. 3. The fourth allocation period is 604.

For example, when the DRX cycle is 640 ms, the first-type measurement 612*a* has a 1.28 s measurement cycle as intra-frequency measurement, the second-type measurement 613*a* has a 1.28 s measurement cycle as inter-frequency measurement, and the third-type measurement 614*a* has a 5.12 s measurement cycle as inter-RAT measurement, the electronic device 101 may perform the first-type measurement 612*a* and the second-type measurement 613*a* according to one paging occasion, and perform the third-type measurement 614*a* according to the next paging occasion. According to the completion of the performing of the paging monitoring 611*b* and the third-type measurement 614*a*, the electronic device 101 may reallocate the use of the at least one RF device to the first SIM 111. The electronic device 101 may identify the expiration of the DRX cycle of the second SIM 112 during a third allocation period 603 of the first SIM 111. As the first cycle and the second cycle (for example, 1.28 s) expire again, the electronic device 101 may perform paging monitoring 611*c*, first-type measurement 612*b*, and second-type measurement 613*b*. Upon the completion of the paging monitoring 611*c*, the first-type measurement 612*b*, and the second-type measurement 613*b*, the electronic device 101 may reallocate the use of the at least one RF device to the first SIM 111 during, for example, a fourth allocation period.

As described above, as the electronic device 101 performs the third-type measurement 614*a* according to a wake-up timing different from those of the first-type measurements 612a and 612b and the second-type measurement 613a and 613b, a blackout period of the first SIM 111 may be relatively shortened.

The embodiment of FIG. 6 illustrates measurement associated with the second SIM 112 of the electronic device 101, but is illustrative, and the electronic device 101 may also perform a detection operation associated with the second SIM 112. When the identified detection cycle expires according to the DRX cycle, the electronic device 101 may also perform detection in the corresponding wake-up timing, together with the paging monitoring and measurement. For example, the electronic device 101 may determine an initiation (or performance) time point of detection so as to cause detection and third-type measurement 614a not to be performed during one wake-up period.

Figure 7:
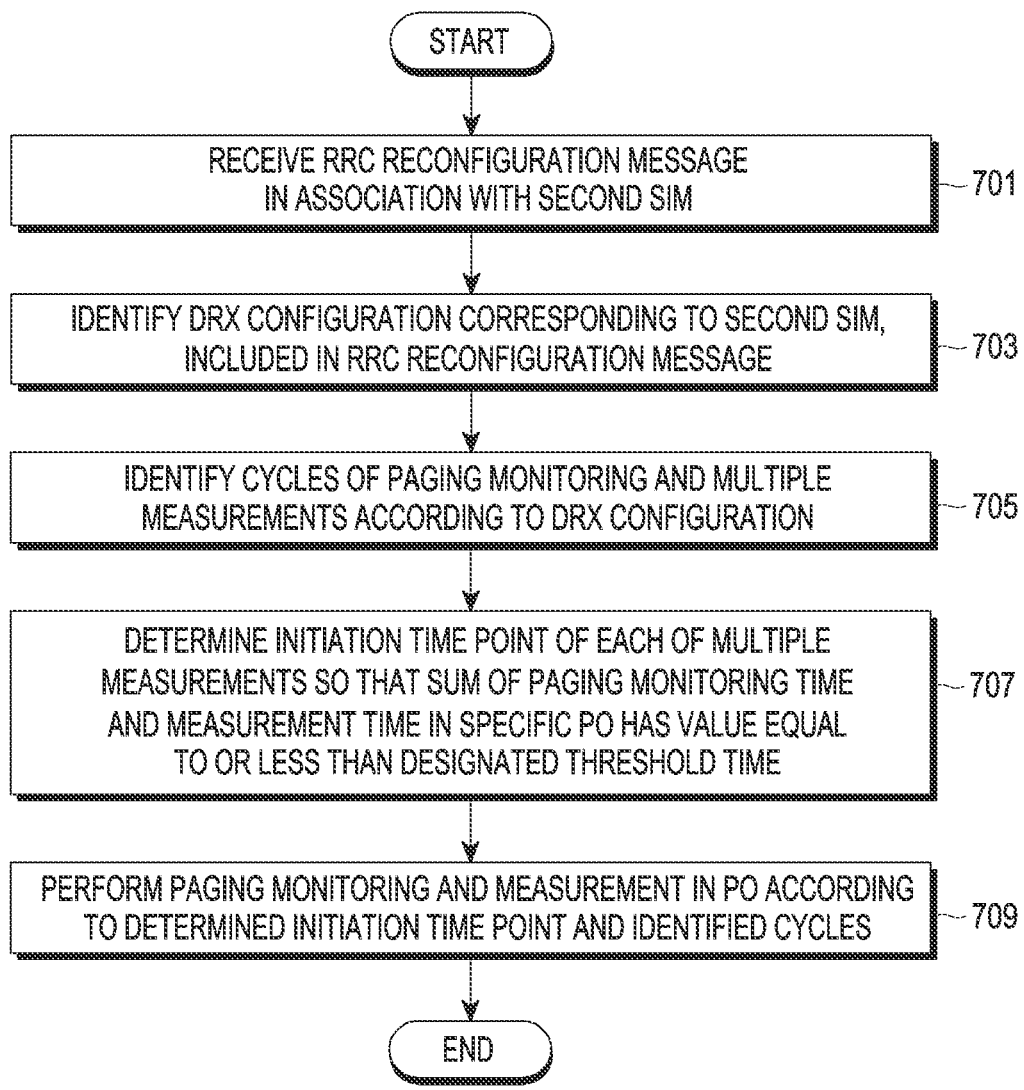
FIG. 7 is a flowchart illustrating an operation method of an electronic device according to an embodiment of the disclosure.

FIG. 7 is a flowchart illustrating an operation method of an electronic device according to an embodiment of the disclosure. An embodiment of FIG. 7 will be described with reference to FIG. 8.

Figure 8:
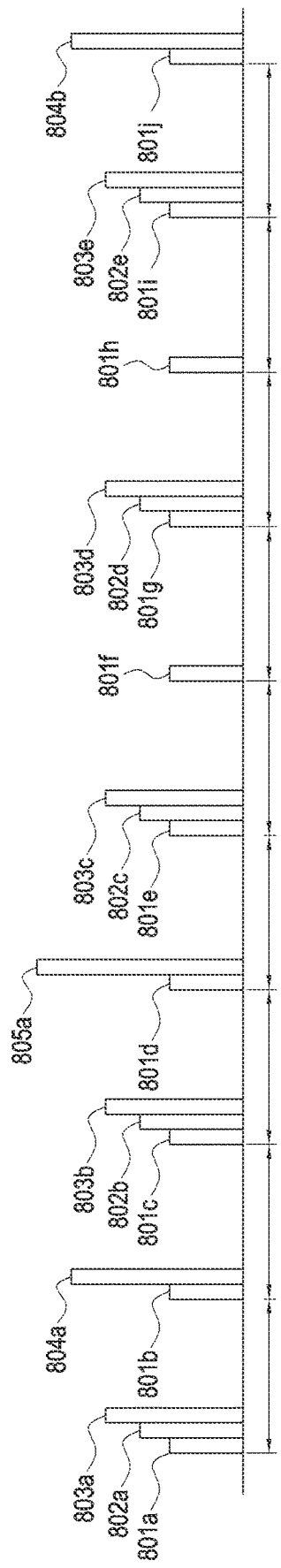
FIG. 8 illustrates a measurement timing associated with one SIM according to an embodiment of the disclosure.

FIG. 8 illustrates a measurement timing associated with one SIM according to an embodiment of the disclosure.

Referring to FIG. 7, in operation 701, the electronic device 101 (for example, at least one of the processor 120, the first communication processor 212, the second communication processor 214, or the integrated communication processor 260) may receive an RRC reconfiguration message in association with the second SIM 112. In operation 703, the electronic device 101 may identify a DRX configuration corresponding to the second SIM 112, the DRX configuration being included in the RRC configuration message. As described above, when a UE-specific DRX configuration has failed to be received, the electronic device 101 may use a default value identified in association with the second SIM 112. In operation 705, the electronic device 101 may identify cycles of paging monitoring and multiple measurements, according to the DRX configuration. For example, the electronic device 101 may identify a DRX cycle as the cycle of the paging monitoring. For example, the electronic device 101 may identify the cycle of the measurement corresponding to the identified DRX cycle, according to association information such as at least one of Table 1, Table 2, or Table 3.

According to various embodiments, in operation 707, the electronic device 101 may determine an initiation time point of each of the multiple measurements so that the sum of a measurement time and a paging monitoring time corresponding to a specific paging occasion corresponds to a designated threshold time or less. The threshold time may be configured in consideration of influence over a service based on the first SIM 111 due to blackout of the first SIM 111, and may be a fixed value or a value changing according to the type of service or a data amount such as data throughput. The electronic device 101 may determine an initiation time point of each of the measurements so that the entire wake-up time associated with the second SIM 112 (for example, the blackout of the first SIM 111) corresponds to a designated threshold time or less. In operation 709, the electronic device 101 may perform paging monitoring and measurement in a paging occasion according to the determined initiation time and the identified cycle.

For example, referring to FIG. 8, the electronic device 101 may identify that the DRX cycle is 640 ms, according to the DRX configuration. According to the 640 ms DRX cycle, the electronic device 101 may identify that the first cycle of the intra-frequency measurement is 1.28 s, the second cycle of the inter-frequency measurement is 1.28 s, the third cycle of the first inter-RAT (e.g., UTRA) measurement is 5.12 s, and the fourth cycle of the second inter-RAT (e.g., NR) is 5.12 s. The electronic device 101 may schedule a time point of each measurement so as to cause a time taken for at least one measurement and paging monitoring associated with the second SIM 112 not to exceed a threshold time. For example, the electronic device 101 may perform paging monitoring 801a, intra-frequency measurement 802a, and inter-frequency measurement 803a during a wake-up period corresponding to the first paging occasion. For example, the electronic device 101 may perform paging monitoring 801b and first inter-RAT measurement 804a during a wake-up period corresponding to the second paging occasion. The electronic device 101 may schedule an initiation time point (or a performance time point) of the first inter-RAT measurement 804a during a wake-up time different from those of the intra-frequency measurement and the second inter-RAT measurement. For example, the electronic device 101 may perform paging monitoring 801c, intra-frequency measurement 802b, and inter-frequency measurement 803b during a wake-up period corresponding to the third paging occasion. For example, the electronic device 101 may perform paging monitoring 801d and second inter-RAT measurement 805a during a wake-up period corresponding to the fourth paging occasion. The electronic device 101 may schedule an initiation time point (or a performance time point) of the second inter-RAT measurement 805a during a wake-up time different from those of the inter-frequency measurement, the intra-frequency measurement, and the first inter-RAT measurement. For example, the electronic device 101 may perform paging monitoring 801e, intra-frequency measurement 802c, and inter-frequency measurement 803c during a wake-up period corresponding to the fifth paging occasion. For example, the electronic device 101 may perform paging monitoring 801f during a wake-up period corresponding to the sixth paging occasion. With respect to the sixth paging occasion, cycles of measurements may not expire. For example, the electronic device 101 may perform paging monitoring 801g, intra-frequency measurement 802d, and inter-frequency measurement 803d during a wake-up period corresponding to the seventh paging occasion. For example, the electronic device 101 may perform paging monitoring 801h during a wake-up period corresponding to the eighth paging occasion. With respect to the eighth paging occasion, cycles of measurements may not expire. For example, the electronic device 101 may perform paging monitoring 801i, intra-frequency measurement 802e, and inter-frequency measurement 803e during a wake-up period corresponding to the ninth paging occasion. For example, the electronic device 101 may perform paging monitoring 801j and first inter-RAT measurement 804b during a wake-up period corresponding to the tenth paging occasion.

In the above-described example, it is illustrated that a measurement time point is scheduled so that a sum of a measurement period and paging monitoring corresponds to a threshold time or less, but it is illustrative, and the electronic device 101 may schedule a measurement time point and a detection time point so that a sum of paging monitoring, a measurement period, and a detection period at one wake-up timing corresponds to a threshold time or less.

Figure 9:
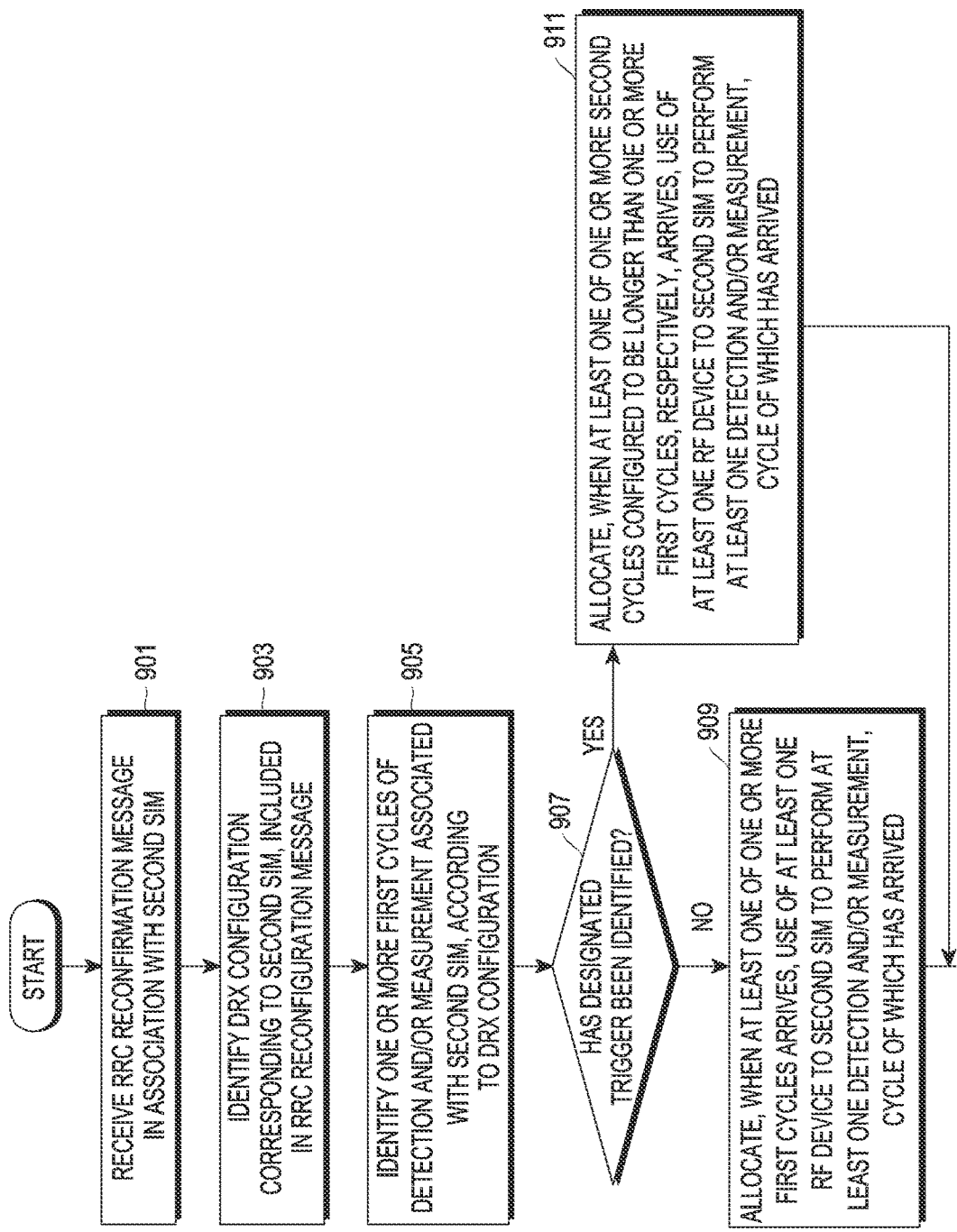
FIG. 9 is a flowchart illustrating an operation method of an electronic device according to an embodiment of the disclosure.

FIG. 9 is a flowchart illustrating an operation method of an electronic device according to an embodiment of the disclosure. The embodiment of FIG. 9 will be described with reference to FIG. 10.

Figure 10:
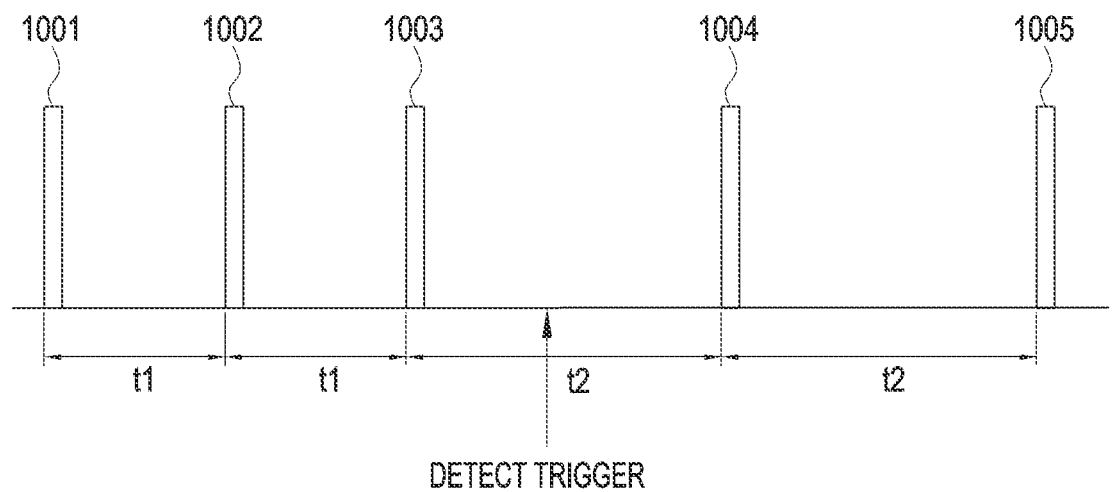
FIG. 10 illustrates a timing for detection and/or measurement associated with one SIM according to an embodiment of the disclosure.

FIG. 10 illustrates a timing for detection and/or measurement associated with one SIM according to an embodiment of the disclosure.

Referring to FIG. 9, in operation 901, the electronic device 101 (for example, at least one of the processor 120, the first communication processor 212, the second communication processor 214, or the integrated communication processor 260) may receive an RRC reconfiguration message associated with the second SIM 112. In operation 903, the electronic device 101 may identify a DRX configuration corresponding to the second SIM 112, the DRX configuration being included the RRC reconfiguration message. As described above, when a UE-specific DRX configuration has failed to be received, the electronic device 101 may use a default value identified in association with the second SIM 112. In operation 905, the electronic device 101 may identify one or more first cycles of detection and/or measurement associated with the second SIM 112, according to the DRX configuration. For example, the electronic device 101 may identify a DRX cycle. For example, the electronic device 101 may identify one or more first cycles of the detection and/or measurement corresponding to the identified DRX cycle, according to association information such as at least one of Table 1, Table 2, or Table 3.

According to various embodiments, in operation 907, the electronic device 101 may identify whether a designated trigger requiring adjustment of one or more first cycles is identified. For example, the designated trigger may be configured in association with a communication environment of a serving cell associated with the second SIM 112. For example, the designated trigger may be configured in association with the size of data transmitted or received in association with the first SIM 111 and/or the type of service in the first SIM 111. Various examples of the trigger will be described below. In another example, a change in a state associated with the first SIM 111 to a connected state may be used as a trigger.

According to various embodiments, in a case where the designated trigger is not identified (if "No" in operation 907), if at least one of one or more first cycles arrives, the electronic device 101 may allocate use of at least one RF device to the second SIM 112 to perform at least one detection and/or measurement, the cycle of which has arrived, in operation 909. In a case where the designated trigger is identified (if "Yes" in operation 907), if at least one of one or more second cycles configured to be longer than one or more first cycles, respectively, arrives, the electronic device 101 may allocate use of at least one RF device to the second SIM 112 to perform at least one detection and/or measurement, the cycle of which has arrived, in operation 911.

For example, referring to FIG. 10, the electronic device 101 may determine one of one or more first cycles as t1 according to the identified DRX cycle. In this case, one of the first cycles may include a cycle of detection or a cycle of measurement. For example, the electronic device 101 may perform measurement (or detection) 1001, 1002, or 1003 during a T1 cycle in association with the second SIM 112. For example, the electronic device 101 may perform measurement (or detection) 1001, 1002, or 1003 associated with the second SIM 112, according to the expiration of a DRX cycle, but for convenience of description, paging monitoring and other detections and/or measurements are not illustrated in FIG. 10. The electronic device 101 may detect a designated trigger after performing measurement (or detection) 1003, and accordingly, may perform measurement (or detection) 1004 after the expiration of a t2 cycle that is an adjusted cycle, and then perform additional measurement (or detection) 1005 during a t2 cycle. In another embodiment, the electronic device 101 may perform measurement (or detection) after a t1 cycle from a time point in which measurement (or detection) 1003 immediately before detection of a trigger is performed, and may perform additional measurement (or detection) at a t2 cycle thereafter. Although not shown, after adjusting the cycle to a t2 cycle, the electronic device 101 may return to the t1 cycle or may readjust the cycle to another cycle.

For example, when the DRX cycle is identified as 320 ms, the electronic device 101 may identify, according to Table 1, Table 2, and Table 3, one or more of a 11.52 s intra-frequency detection cycle, a 11.52 s inter-frequency detection cycle, a 30 s inter-RAT detection cycle, a 1.28 s intra-frequency measurement cycle, a 1.28 s inter-frequency measurement cycle, and a 5.12 s inter-RAT measurement cycle, as one or more first cycles. If there is no designated trigger detected, the electronic device 101 may perform detection and/or measurement according to the one or more first cycles. If a designated trigger is detected, the electronic device 101 may identify one or more second cycles obtained by adjusting at least some of the one or more first cycles. For example, the electronic device 101 may adjust an intra-frequency detection cycle to 17.52 s which is longer than 11.52 s. The electronic device 101 may determine 17.52 s corresponding to the 640 ms DRX cycle in Table 1, as an adjusted detection cycle, but the adjusted detection cycle is not limited thereto. For example, the electronic device 101 may also determine 32 s corresponding to a 1280 ms DRX cycle, or 58.88 s corresponding to a 2560 ms DRX cycle, as an adjusted detection cycle. Alternatively, the electronic device 101 may also determine a numerical value not defined in Table 1, as an adjusted detection cycle. The electronic device 101 may also adjust the inter-frequency detection cycle and/or inter-RAT detection cycle with a numerical value defined in Table 2 or Table 3 or another numerical value. The electronic device 101 may also adjust the intra-frequency measurement cycle, the inter-frequency measurement cycle, and/or the inter-RAT measurement cycle with a numerical value defined in Table 2 or Table 3 or another numerical value. In various embodiments, the electronic device 101 may adjust all detection cycles and measurement cycles with longer cycles when the designated trigger is detected. Alternatively, when the designated trigger is detected, the electronic device 101 may adjust some of all detection cycles and measurement cycles with longer cycles and maintain the remaining cycles as cycles configured according to the DRX cycle.

As described above, as the electronic device 101 configures a relatively long detection and/or measurement cycle associated with the second SIM 112, a blackout period of the first SIM 111 may be relatively shortened, whereby possibility that a service associated with the first SIM 111 is influenced can be reduced.

Figure 11:
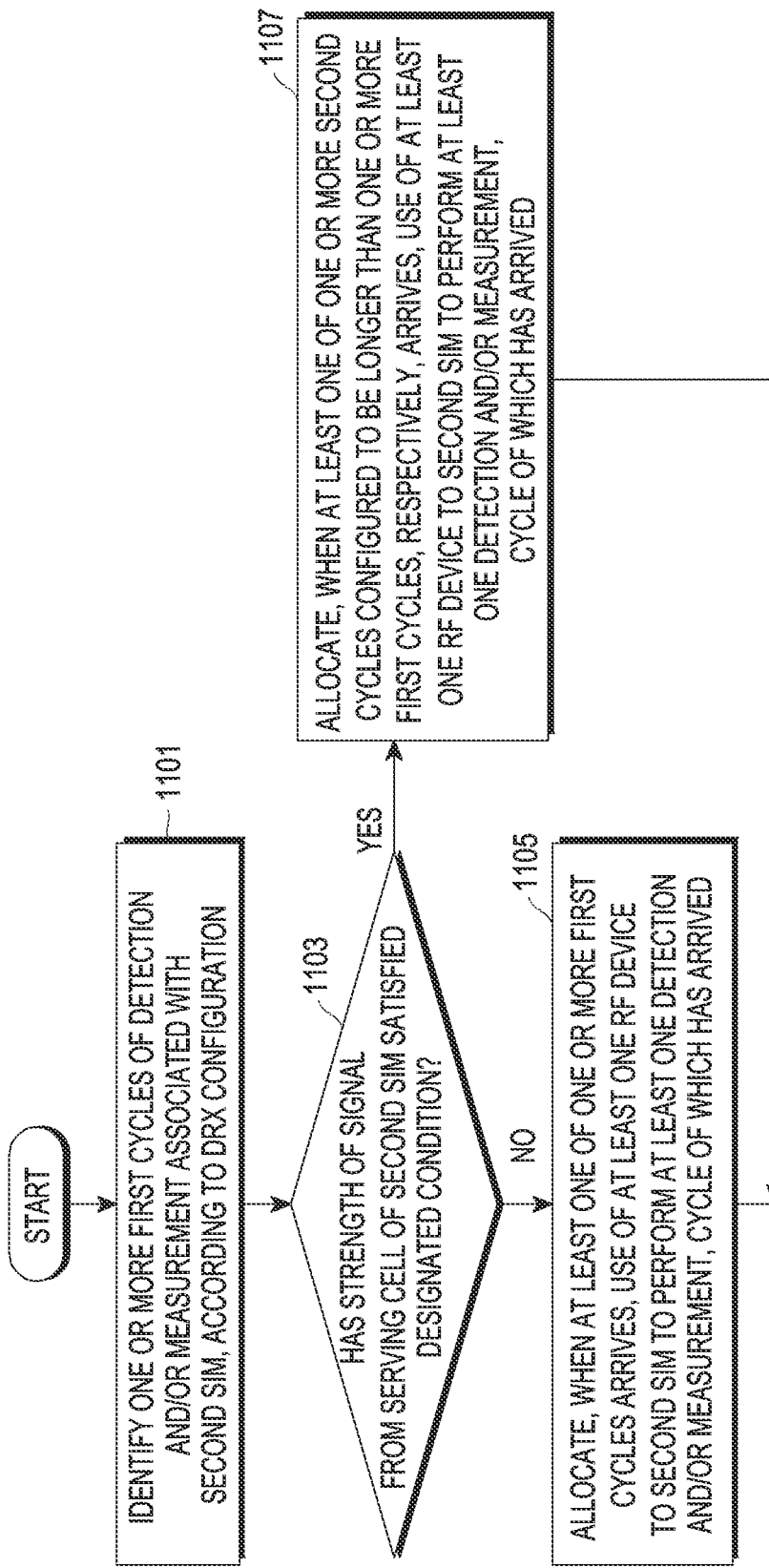
FIG. 11 is a flowchart illustrating an operation method of an electronic device according to an embodiment of the disclosure.

FIG. 11 is a flowchart illustrating an operation method of an electronic device according to an embodiment of the disclosure.

Referring to FIG. 11, in operation 1101, the electronic device 101 (for example, at least one of the processor 120, the first communication processor 212, the second communication processor 214, or the integrated communication processor 260) may identify at least one first cycle of detection and/or measurement associated with the second SIM 112, according to a DRX configuration. For example, the electronic device 101 may identify at least one first cycle of detection and/or measurement corresponding to a DRX cycle, according to Table 1, Table 2, and Table 3.

According to various embodiments, in operation 1103, the electronic device 101 may identify whether the strength of a signal of a serving cell of the second SIM 112, as one of designated triggers, satisfies a designated condition. In this case, the designated condition is not limited if a condition indicates a case in which there is relatively low possibility that a cell associated with the second SIM 112 is reselected. In a case where there is relatively low possibility that cell reselection is performed, even though a detection and/or measurement cycle increases (for example, the number of times of detection and/or measurement decreases), there may be low possibility that a communication environment deteriorates. For example, when the strength of a signal of a serving cell is equal to or greater than a threshold strength (for example −90 dBm), it may mean that the electronic device 101 is positioned relatively closer to a base station corresponding to the serving cell, and in this case, there is relatively low possibility that cell reselection is performed. For example, when a change in the strength of a signal of a serving cell during a predetermined time is equal to or less than a threshold change value (for example 10 dBm), it may mean that the mobility of the electronic device 101 is relatively low, and in this case, there is relatively low possibility that cell reselection is performed. In a case where a designated condition indicating that there is relatively low possibility that cell reselection is performed has failed to be satisfied (if "No" in operation 1103), if at least one of one or more first cycles arrives, the electronic device 101 may allocate use of the at least one RF device to the second SIM 112 to perform at least one detection and/or measurement, the cycle of which has arrived, in operation 1105. When the designated condition has failed to be satisfied, it may indicate a case where there is relatively high possibility that cell reselection is performed, and thus, the electronic device 101 may be configured to perform detection and/or measurement based on at least one first cycle identified according to the DRX cycle. In a case where a designated condition indicating that there is relatively low possibility that cell reselection is performed is satisfied (if "Yes" in operation 1103), if at least one of one or more second cycles configured to be longer than one or more first cycles, respectively, arrives, the electronic device 101 may allocate use of at least one RF device to the second SIM to perform at least one detection and/or measurement, the cycle of which has arrived, in operation 1107. When the designated condition is satisfied, it may indicate a case where there is relatively low possibility that cell reselection is performed, and thus, the electronic device 101 may be configured to perform detection and/or measurement based on at least one second cycle configured to be longer than at least one first cycle identified according to the DRX cycle.

Figure 12:
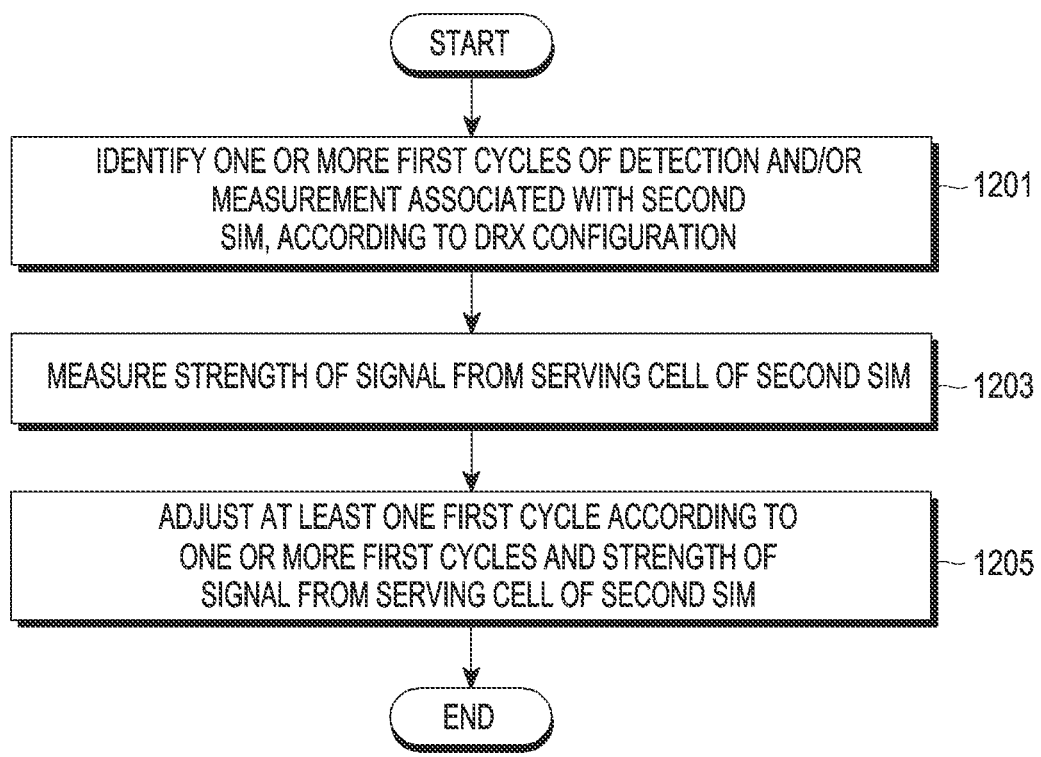
FIG. 12 is a flowchart illustrating an operation method of an electronic device according to an embodiment of the disclosure.

FIG. 12 is a flowchart illustrating an operation method of an electronic device according to an embodiment of the disclosure.

Referring to FIG. 12, in operation 1201, the electronic device 101 (for example, at least one of the processor 120, the first communication processor 212, the second communication processor 214, or the integrated communication processor 260) may identify one or more first cycles of detection and/or measurement associated with the second SIM 112, according to a DRX configuration. For example, the electronic device 101 may identify one or more first cycles of detection and/or measurement corresponding to a DRX cycle, according to Table 1, Table 2, and Table 3. In operation 1203, the electronic device 101 may measure the strength of a signal from a serving cell associated with the second SIM 112.

According to various embodiments, in operation 1205, the electronic device 101 may adjust at least one first cycle according to the one or more first cycle and the strength of a signal from a serving cell of the second SIM 112. For example, the electronic device 101 may identify that a DRX cycle corresponds to 320 ms, and may identify that an intra-frequency detection cycle corresponding thereto is 11.52 s. If the strength of a signal from a serving cell is in a first range, the electronic device 101 may maintain the intra-frequency detection cycle as 11.52 s. If the strength of a signal from a serving cell is in a second range, the electronic device 101 may adjust the intra-frequency detection cycle to 17.92 s. If the strength of a signal from a serving cell is in a third range, the electronic device 101 may adjust the intra-frequency detection cycle to 32 s.

Figure 13:
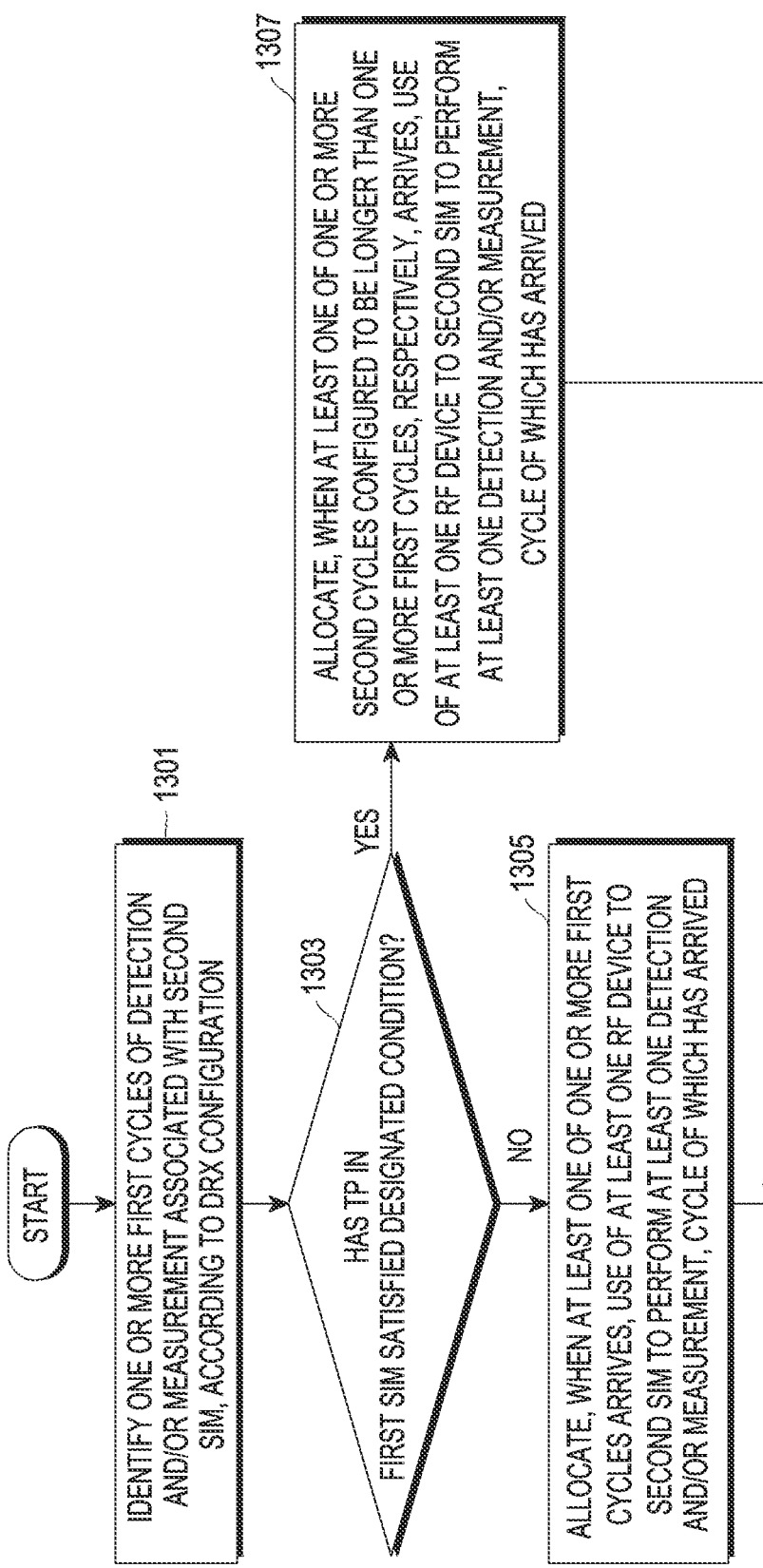
FIG. 13 is a flowchart illustrating an operation method of an electronic device according to an embodiment of the disclosure.

FIG. 13 is a flowchart illustrating an operation method of an electronic device according to an embodiment of the disclosure.

Referring to FIG. 13, in operation 1301, the electronic device 101 (for example, at least one of the processor 120, the first communication processor 212, the second communication processor 214, or the integrated communication processor 260) may identify one or more first cycles of detection and/or measurement associated with the second SIM 112, according to a DRX configuration. For example, the electronic device 101 may identify one or more first cycles of detection and/or measurement corresponding to a DRX cycle according to Table 1, Table 2, and Table 3.

According to various embodiments, in operation 1303, the electronic device 101 may identify whether data throughput (TP) in the first SIM 111 satisfies a designated condition (for example, threshold data throughput or more). In this case, the designated condition is not limited if a condition indicates a state in which the size of data to be transmitted or received is relatively large, and a parameter other than the TP may be also used. For example, when the TP is relatively high, there is relatively high possibility that a service disconnection phenomenon occurs due to a long blackout period of the first SIM 111. Accordingly, the electronic device 101 needs to shorten the blackout period of the first SIM 111. If the TP is relatively low, an influence to a service due to the blackout of the first SIM 111 may be relatively small.

According to various embodiments, in a case where the TP in the first SIM 111 fails to satisfy a designated condition (if "No" in operation 1303), when at least one of one or more first cycles arrives, the electronic device 101 may allocate use of at least one RF device to the second SIM 112 to perform at least one detection and/or measurement, the cycle of which has arrived, in operation 1305. For example, when the TP is relatively low, there is low possibility that the service in the first SIM 111 is influenced due to the blackout of the first SIM 111, and thus the electronic device 101 may perform detection and/or measurement according to the at least one first cycle identified according to a DRX cycle.

According to various embodiments, in a case where the TP in the first SIM 111 satisfies a designated condition (if "Yes" in operation 1303), if at least one of one or more second cycles configured to be longer than one or more first cycles, respectively, arrives, the electronic device 101 may allocate use of at least one RF device to the second SIM to perform at least one detection and/or measurement, the cycle of which has arrived, in operation 1307. For example, when the TP is relatively high, there is high possibility that the service in the first SIM 111 is influenced due to the blackout of the first SIM 111, and thus the electronic device 101 may perform detection and/or measurement according to a cycle longer than the at least one first cycle identified according to a DRX cycle.

According to various embodiments, the electronic device 101 may adjust one or more first cycles according to the TP in the first SIM 111. For example, the electronic device 101 may identify that a DRX cycle associated with the second SIM 112 is 320 ms, and may identify that an intra-frequency detection cycle corresponding thereto is 11.52. If the TP in the first SIM 111 is included in a first range, the electronic device 101 may maintain the intra-frequency detection cycle associated with the second SIM 112 as 11.52 s. If the TP in the first SIM 111 is included in a second range, the electronic device 101 may adjust the intra-frequency detection cycle associated with the second SIM 112 to 17.92 s. If the TP in the first SIM 111 is included in a third range, the electronic device 101 may adjust the intra-frequency detection cycle associated with the second SIM 112 to 32 s.

Figure 14:
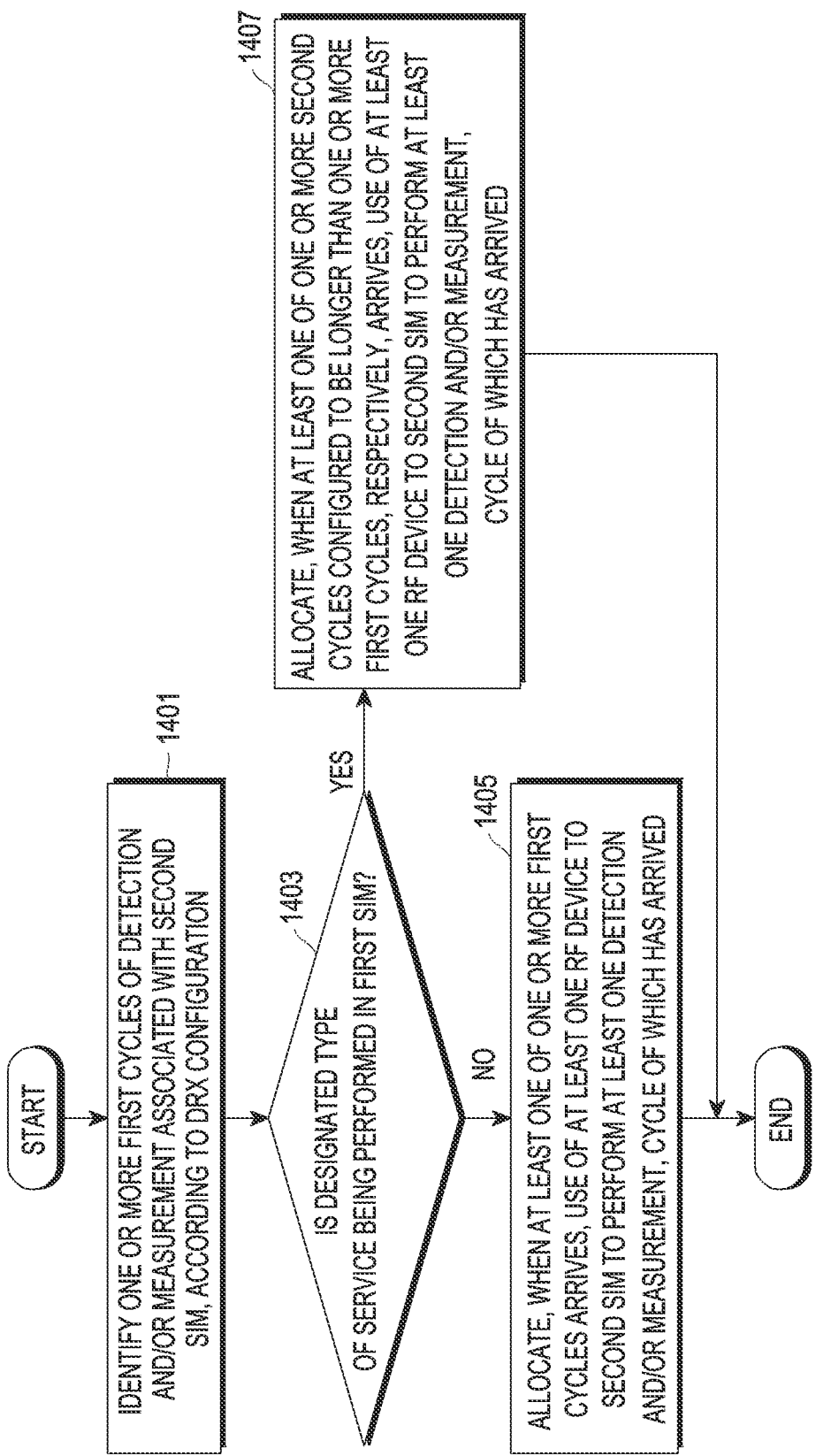
FIG. 14 is a flowchart illustrating an operation method of an electronic device according to an embodiment of the disclosure.

FIG. 14 is a flowchart illustrating an operation method of an electronic device according to an embodiment of the disclosure.

Referring to FIG. 14, in operation 1401, the electronic device 101 (for example, at least one of the processor 120, the first communication processor 212, the second communication processor 214, or the integrated communication processor 260) may identify one or more first cycles of detection and/or measurement associated with the second SIM 112, according to a DRX configuration. For example, the electronic device 101 may identify one or more first cycles of detection and/or measurement corresponding to a DRX cycle according to Table 1, Table 2, and Table 3.

According to various embodiments, in operation 1403, the electronic device 101 may identify whether a designated type of service is performed in the first SIM 111. The designated type of service may be configured with a service which is highly likely to be influenced due to blackout of the first SIM 111, and, for example, an ultra-low latency service may be configured, but the type of service is not limited. For example, the electronic device 101 may identify whether the ultra-low latency service is performed during an allocation period of the first SIM 111. For example, the electronic device 101 may identify whether the ultra-low latency service is performed in the first SIM 111, according to a slice service type (SST) and/or a data network name (DNN). For example, the electronic device 101 may identify that the ultra-low latency service is performed in the first SIM 111 when a resource type of a quality of service (QoS) identification (ID) (QI) corresponds to QI 82 to QI 85 indicated by a delay critical GBR. For example, in the case of QI 82 to QI 85, a packet delay budget is configured with 5 to 30 ms, and thus the electronic device 101 may identify the same as the ultra-low latency service.

According to various embodiments, in a case where a designated type of service is not performed in the first SIM 111 (if "No" in operation 1403), when at least one of one or more first cycles arrives, the electronic device 101 may allocate use of at least one RF device to the second SIM 112 to perform at least one detection and/or measurement, the cycle of which has arrived, in operation 1405. For example, when a service that is less likely influenced due to blackout of the first SIM 111 is performed, the electronic device 101 may perform detection and/or measurement according to at least one first cycle corresponding to a DRX cycle. In a case where a designated type of service is performed in the first SIM 111 (if "Yes" in operation 1403), if at least one of one or more second cycles configured to be longer than one or more first cycles, respectively, arrives, the electronic device 101 may allocate use of at least one RF device to the second SIM to perform at least one detection and/or measurement, the cycle of which has arrived, in operation 1407. For example, when a service that is less likely influenced due to blackout of the first SIM 111 is performed, the electronic device 101 may perform detection and/or measurement according to a cycle longer than at least one first cycle corresponding to a DRX cycle.

Figure 15:
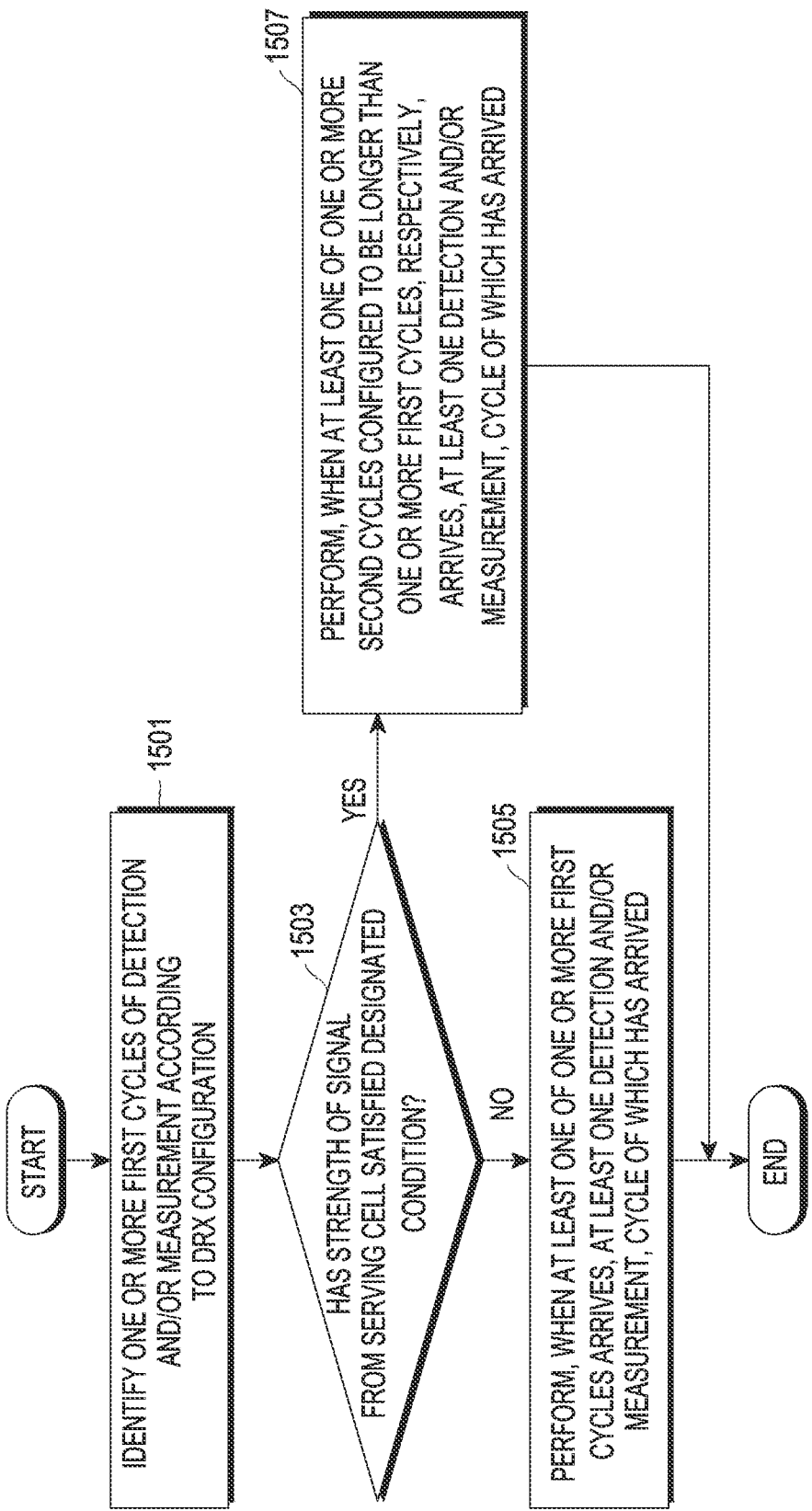
FIG. 15 is a flowchart illustrating an operation method of an electronic device according to an embodiment of the disclosure.

FIG. 15 is a flowchart illustrating an operation method of an electronic device according to an embodiment of the disclosure.

Referring to FIG. 15, in operation 1501, the electronic device 101 (for example, at least one of the processor 120, the first communication processor 212, the second communication processor 214, or the integrated communication processor 260) may identify at least one first cycle of detection and/or measurement associated with the second SIM 112, according to a DRX configuration. In this embodiment, it is presumed that the electronic device 101 can support one SIM (or can be connected to one SIM). The electronic device 101 may identify a DRX configuration of the connected SIM. For example, the electronic device 101 may identify one or more first cycles of detection and/or measurement corresponding to a DRX cycle according to Table 1, Table 2, and Table 3.

According to various embodiments, in operation 1503, the electronic device 101 may identify whether the strength of a signal of a serving cell satisfies a designated condition. In this case, the designated condition is not limited if a condition indicates a case in which there is relatively low possibility that cell reselection is performed. In a case where there is relatively low possibility that cell reselection is performed, even though a detection and/or measurement cycle increases (for example, the number of times of detection and/or measurement decreases), there may be low possibility that a communication environment deteriorates. For example, when the strength of a signal of a serving cell is equal to or greater than a threshold strength (for example −90 dBm), it may mean that the electronic device 101 is positioned relatively closer to a base station corresponding to the serving cell, and in this case, there is relatively low possibility that cell reselection is performed. For example, when a change in the strength of a signal of a serving cell during a predetermined time is equal to or less than a threshold change value (for example 10 dBm), it may mean that the mobility of the electronic device 101 is relatively low, and in this case, there is relatively low possibility that cell reselection is performed. In a case where a designated condition indicating that there is relatively low possibility that cell reselection is performed has failed to be satisfied (if "No" in operation 1503), if at least one of one or more first cycles arrives, the electronic device 101 may perform at least one detection and/or measurement, the cycle of which has arrived, in operation 1505. When the designated condition has failed to be satisfied, it may indicate a case where there is relatively high possibility that cell reselection is performed, and thus, the electronic device 101 may be configured to perform detection and/or measurement based on the at least one first cycle identified according to the DRX cycle. In a case where a designated condition indicating that there is relatively low possibility that cell reselection is performed is satisfied (if "Yes" in operation 1503), if at least one of one or more second cycles configured to be longer than one or more first cycles, respectively, arrives, the electronic device 101 may perform at least one detection and/or measurement, the cycle of which has arrived, in operation 1507. When the designated condition is satisfied, it may indicate a case where there is relatively low possibility that cell reselection is performed, and thus, the electronic device 101 may perform detection and/or measurement based on the at least one second cycle configured to be longer than the at least one first cycle identified according to the DRX cycle. According to the description above, the power consumption of the electronic device 101 can be reduced.

According to various embodiments, an electronic device 101 may include at least one processor (for example, at least one of a processor 120, a first communication processor 212, a second communication processor 214, or an integrated communication processor 260) connected to a first SIM (e.g., a first SIM 111) and a second SIM (e.g., a second SIM 112), and at least one RF device (e.g., at least one of a first RFIC 222, a second RFIC 224, a third RFIC 226, a fourth RFIC 228, a first RFFE 232, a second RFFE 234, a third RFFE 236, a phase shifter 238, a first antenna module 242, a second antenna module 244, or a third antenna module 246) used for communication based on the first SIM and communication based on the second SIM. The at least one processor may be configured to identify expiration of a timer for paging monitoring associated with the second SIM while use of the at least one RF device is allocated to the first SIM, to allocate the use of the at least one RF device to the second SIM to perform first paging monitoring and first-type measurement, to reallocate the use of the at least one RF device to the first SIM according to completion of the first paging monitoring and the first-type measurement, to identify expiration of the timer for the paging monitoring associated with the second SIM while the use of the at least one RF device is reallocated to the first SIM, and to allocate the use of the at least one RF device to the second SIM to perform second paging monitoring and second-type measurement that is different from the first-type measurement.

According to various embodiments, the at least one processor may be configured to allocate the use of the at least one RF device to the second SIM to perform, as at least a part of the performing of the first paging monitoring and the first-type measurement, intra-frequency measurement as the first-type measurement, and to allocate the use of the at least one RF device to the second SIM to perform, as at least a part of the performing of the second paging monitoring and the second-type measurement that is different from the first-type measurement, inter-frequency measurement as the second-type measurement.

According to various embodiments, the at least one processor may be further configured to perform inter-RAT measurement.

According to various embodiments, the inter-RAT measurement may be performed during at least one of a period in which the use of the RF device is allocated to the second SIM to perform the first-type measurement, a period in which the use of the RF device is allocated to the second SIM to perform the second-type measurement, or a period in which neither the first-type measurement nor the second-type measurement is performed and the use of the RF device is allocated to the second SIM.

According to various embodiments, at least one processor may be configured to allocate the use of the at least one RF device to the second SIM to perform, as at least a part of the performing of the first paging monitoring and the first-type measurement, one of intra-frequency measurement and inter-frequency measurement as the first-type measurement, and to allocate the use of the at least one RF device to the second SIM to perform, as at least a part of the performing of the second paging monitoring and the second-type measurement that is different from the first-type measurement, inter-RAT measurement as the second-type measurement.

According to various embodiments, the at least one processor may be further configured to perform third-type measurement during a period in which the use of the RF device is allocated to the second SIM to perform the first-type measurement, wherein when the first-type measurement is the intra-frequency measurement, the third-type measurement is the inter-frequency measurement, and when the first-type measurement is the inter-frequency measurement, the third-type measurement is the intra-frequency measurement.

According to various embodiments, the at least one processor may be further configured to identify a discontinuous reception (DRX) configuration associated with the electronic device, to identify a DRX cycle based on the DRX configuration, as the timer, and to identify a first measurement cycle of the first-type measurement and a second measurement cycle of the second-type measurement according to the DRX cycle.

According to various embodiments, the at least one processor may be further configured to allocate the use of the at least one RF device to the second SIM to perform third paging monitoring and the first-type measurement when expiration of the timer for the paging monitoring and expiration of the first measurement cycle are identified while the use of the at least one RF device is allocated to the first SIM, and to allocate the use of the at least one RF device to the second SIM to perform fourth paging monitoring and the second-type measurement when expiration of the timer for the paging monitoring and expiration of the second measurement cycle are identified while the use of the at least one RF device is allocated to the first SIM.

According to various embodiments, a method for operating an electronic device including at least one RF device used for communication based on the first SIM and communication based on the second SIM may include identifying expiration of a timer for paging monitoring associated with the second SIM while use of the at least one RF device is allocated to the first SIM, allocating the use of the at least one RF device to the second SIM to perform first paging monitoring and first-type measurement, reallocating the use of the at least one RF device to the first SIM according to completion of the first paging monitoring and the first-type measurement, identifying, expiration of the timer for the paging monitoring associated with the second SIM while the use of the at least one RF device is reallocated to the first SIM, and allocating the use of the at least one RF device to the second SIM to perform second paging monitoring and second-type measurement that is different from the first-type measurement.

According to various embodiments, the allocating of the use of the at least one RF device to the second SIM to perform the first paging monitoring and the first-type measurement may include performing intra-frequency measurement as the first-type measurement, and the allocating of the use of the at least one RF device to the second SIM to perform the second paging monitoring and the second-type measurement that is different from the first-type measurement may include performing inter-frequency measurement as the second-type measurement.

According to various embodiments, the method for operating the electronic device may further include performing inter-RAT measurement.

According to various embodiments, the inter-RAT measurement may be performed during at least one of a period in which the use of the RF device is allocated to the second SIM to perform the first-type measurement, a period in which the use of the RF device is allocated to the second SIM to perform the second-type measurement, or a period in which neither the first-type measurement nor the second-type measurement is performed and the use of the RF device is allocated to the second SIM.

According to various embodiments, the allocating of the use of the at least one RF device to the second SIM to perform the first paging monitoring and the first-type measurement may include performing one of intra-frequency measurement and inter-frequency measurement as the first-type measurement, and performing, as at least a part of the allocating of the use of the at least one RF device to the second SIM to perform the second paging monitoring and the second-type measurement that is different from the first-type measurement, inter-RAT measurement as the second-type measurement.

According to various embodiments, the method for operating the electronic device may further include performing third-type measurement during a period in which the use of the RF device is allocated to the second SIM to perform the first-type measurement, wherein when the first-type measurement is the intra-frequency measurement, the third-type measurement is the inter-frequency measurement, and when the first-type measurement is the inter-frequency measurement, the third-type measurement is the intra-frequency measurement.

According to various embodiments, the method for operating the electronic device may further include identifying a discontinuous reception (DRX) configuration associated with the electronic device, identifying a DRX cycle based on the DRX configuration, as the timer, and identifying a first measurement cycle of the first-type measurement and a second measurement cycle of the second-type measurement according to the DRX cycle.

According to various embodiments, the method for operating the electronic device may further include allocating the use of the at least one RF device to the second SIM to perform third paging monitoring and the first-type measurement when the expiration of the timer for the paging monitoring and the expiration of the first measurement cycle are identified while the use of the at least one RF device is allocated to the first SIM, and allocating the use of the at least one RF device to the second SIM to perform fourth paging monitoring and the second-type measurement when the expiration of the timer for the paging monitoring and the expiration of the second measurement cycle are identified while the use of the at least one RF device is allocated to the first SIM.

According to various embodiments, an electronic device 101 may include at least one processor (for example, at least one of a processor 120, a first communication processor 212, a second communication processor 214, or an integrated communication processor 260) connected to a first SIM (e.g., a first SIM 111) and a second SIM (e.g., a second SIM 112), and at least one RF device (e.g., at least one of a first RFIC 222, a second RFIC 224, a third RFIC 226, a fourth RFIC 228, a first RFFE 232, a second RFFE 234, a third RFFE 236, a phase shifter 238, a first antenna module 242, a second antenna module 244, or a third antenna module 246) used for communication based on the first SIM and communication based on the second SIM. The at least one processor may be configured to identify one or more first cycles of detection and/or measurement associated with the second SIM, according to discontinuous reception (DRX) configuration information associated with the electronic device, to allocate use of the at least one RF device to the second SIM to perform at least one detection and/or measurement, the cycle of which has arrived, when a designated trigger is not identified while an operation associated with the first SIM is performed and when at least one of the one or more first cycles arrives while the use of the at least one RF device is allocated to the first SIM, and to allocate use of the at least one RF device to the second SIM to perform at least one detection and/or measurement, the cycle of which has arrived, when the designated trigger is identified while the operation associated with the first SIM is performed and when at least one of one or more second cycles configured to be longer than the one or more first cycles, respectively, arrives while the use of the at least one RF device is allocated to the first SIM.

According to various embodiments, the at least one processor may be further configured to detect that the trigger has occurred when the strength of a signal from a serving cell associated with the second SIM is equal to or greater than a designated threshold strength and/or when a change in the strength of the signal from the serving cell is equal to or less than a threshold change value.

According to various embodiments, the at least one processor may be further configured to detect that the trigger has occurred when data throughput associated with the first SIM is equal to or greater than threshold data throughput.

According to various embodiments, the at least one processor may be configured to detect that the trigger has occurred when a designated type of service is performed in association with the first SIM.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device comprising:
at least one processor; and
at least one radio frequency (RF) device used for communication based on a first subscriber identity module (SIM) and communication based on a second SIM,
wherein the at least one processor is configured to:
identify an expiration of a timer for a paging monitoring associated with the second SIM while use of the at least one RF device is allocated to the first SIM,
allocate the use of the at least one RF device to the second SIM to perform a first paging monitoring and a first-type measurement,
reallocate the use of the at least one RF device to the first SIM according to completion of the first paging monitoring and the first-type measurement,
identify expiration of the timer for the paging monitoring associated with the second SIM while the use of the at least one RF device is reallocated to the first SIM, and
allocate the use of the at least one RF device to the second SIM to perform a second paging monitoring and a second-type measurement that is different from the first-type measurement.

2. The electronic device of claim 1, wherein the at least one processor is further configured to:
allocate the use of the at least one RF device to the second SIM to perform the first paging monitoring and an intra-frequency measurement as the first-type measurement, and
allocate the use of the at least one RF device to the second SIM to perform the second paging monitoring and an inter-frequency measurement as the second-type measurement.

3. The electronic device of claim 2, wherein the at least one processor is further configured to perform an inter-radio access technology (RAT) measurement.

4. The electronic device of claim 3, wherein the inter-RAT measurement is performed during at least one of:
a period in which the use of the RF device is allocated to the second SIM to perform the first-type measurement;
a period in which the use of the RF device is allocated to the second SIM to perform the second-type measurement; or
a period in which neither the first-type measurement nor the second-type measurement is performed and the use of the RF device is allocated to the second SIM.

5. The electronic device of claim 1, wherein the at least one processor is further configured to:
allocate the use of the at least one RF device to the second SIM to perform the first paging monitoring and one of an intra-frequency measurement and an inter-frequency measurement as the first-type measurement, and
allocate the use of the at least one RF device to the second SIM to perform the second paging monitoring and the second-type measurement that is different from the first-type measurement, an inter-RAT measurement as the second-type measurement.

6. The electronic device of claim 5,
wherein the at least one processor is further configured to perform a third-type measurement during a period in which the use of the RF device is allocated to the second SIM to perform the first-type measurement,
wherein, in case that the first-type measurement is the intra-frequency measurement, the third-type measurement is the inter-frequency measurement, and
wherein, in case that the first-type measurement is the inter-frequency measurement, the third-type measurement is the intra-frequency measurement.

7. The electronic device of claim 1, wherein the at least one processor is further configured to:
identify a discontinuous reception (DRX) configuration associated with the electronic device, identify a DRX cycle based on the DRX configuration, as the timer, and identify a first measurement cycle of the first-type measurement and a second measurement cycle of the second-type measurement according to the DRX cycle.

8. The electronic device of claim 7, wherein the at least one processor is further configured to:

allocate the use of the at least one RF device to the second SIM to perform a third paging monitoring and the first-type measurement in case that expiration of the timer for the paging monitoring and expiration of the first measurement cycle are identified while the use of the at least one RF device is allocated to the first SIM, and allocate the use of the at least one RF device to the second SIM to perform a fourth paging monitoring and the second-type measurement in case that expiration of the timer for the paging monitoring and expiration of the second measurement cycle are identified while the use of the at least one RF device is allocated to the first SIM.

9. A method for operating an electronic device comprising at least one radio frequency (RF) device used for communication based on a first subscriber identity module (SIM) and communication based on a second SIM, the method comprising:

identifying an expiration of a timer for a paging monitoring associated with the second SIM while use of the at least one RF device is allocated to the first SIM;

allocating the use of the at least one RF device to the second SIM to perform a first paging monitoring and a first-type measurement;

reallocating the use of the at least one RF device to the first SIM according to completion of the first paging monitoring and the first-type measurement;

identifying, expiration of the timer for the paging monitoring associated with the second SIM while the use of the at least one RF device is reallocated to the first SIM; and allocating the use of the at least one RF device to the second SIM to perform a second paging monitoring and a second-type measurement that is different from the first-type measurement.

10. The method of claim 9, wherein the allocating of the use of the at least one RF device to the second SIM to perform the first paging monitoring and an intra-frequency measurement as the first-type measurement, and wherein the allocating of the use of the at least one RF device to the second SIM to perform the second paging monitoring and an inter-frequency measurement as the second-type measurement.

11. The method of claim 10, further comprising performing an inter-RAT measurement.

12. The method of claim 11, wherein the inter-RAT measurement is performed during at least one of:

a period in which the use of the RF device is allocated to the second SIM to perform the first-type measurement;

a period in which the use of the RF device is allocated to the second SIM to perform the second-type measurement; or a period in which neither the first-type measurement nor the second-type measurement is performed and the use of the RF device is allocated to the second SIM.

13. The method of claim 9, wherein the allocating of the use of the at least one RF device to the second SIM to perform the first paging monitoring and one of an intra-frequency measurement and an inter-frequency measurement as the first-type measurement, and wherein the allocating of the use of the at least one RF device to the second SIM to perform the second paging monitoring and the second-type measurement that is different from the first-type measurement, an inter-RAT measurement as the second-type measurement.

14. The method of claim 13, further comprising:

performing a third-type measurement during a period in which the use of the RF device is allocated to the second SIM to perform the first-type measurement, wherein, in case that the first-type measurement is the intra-frequency measurement, the third-type measurement is the inter-frequency measurement, and wherein, in case that the first-type measurement is the inter-frequency measurement, the third-type measurement is the intra-frequency measurement.

15. The method of claim 9, further comprising:

identifying a discontinuous reception (DRX) configuration associated with the electronic device;

identifying a DRX cycle based on the DRX configuration, as the timer; and identifying a first measurement cycle of the first-type measurement and a second measurement cycle of the second-type measurement according to the DRX cycle.

16. The method of claim 15, further comprising:

identifying at least one first cycle of detection or measurement associated with the second SIM, according to the DRX configuration; and identifying whether a strength of a signal of a serving cell satisfies a designated condition.

17. The method of claim 16, wherein, in a case where the designated condition is satisfied, when at least one of one or more second cycles is configured to be longer than one or more first cycles, respectively arrives, perform at least one of detection or measurement of the second cycle which has arrived.

18. The method of claim 17, wherein, in a case where the designated condition is not satisfied, when the at least one of one or more first cycles arrives, perform at least one of detection or measurement of the first cycle which has arrived.

* * * * *